US012093872B2

(12) United States Patent
Mahindru et al.

(10) Patent No.: US 12,093,872 B2
(45) Date of Patent: Sep. 17, 2024

(54) EVALUATING EFFECTS OF AN ARTIFICIAL INTELLIGENCE MODEL ON ENTERPRISE PERFORMANCE OBJECTIVES

(71) Applicant: International Business Machines Corporation, Armonk, NY (US)

(72) Inventors: Ruchi Mahindru, Elmsford, NY (US); Daniela Rosu, Mount Kisco, NY (US); Atul Kumar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/514,295

(22) Filed: Oct. 29, 2021

(65) Prior Publication Data

US 2023/0140553 A1 May 4, 2023

(51) Int. Cl.
*G06Q 10/06* (2023.01)
*G06Q 10/0637* (2023.01)
*G06Q 10/0639* (2023.01)

(52) U.S. Cl.
CPC . *G06Q 10/06375* (2013.01); *G06Q 10/06393* (2013.01)

(58) Field of Classification Search
CPC .............. G06Q 10/06375; G06Q 10/06393
See application file for complete search history.

(56) References Cited

U.S. PATENT DOCUMENTS 8,527,801 B2 * 9/2013 Brock ................ G06F 1/3203
 713/340
8,538,787 B2 9/2013 Braun et al.
(Continued)

FOREIGN PATENT DOCUMENTS

CN 105408920 B 1/2018
CN 109102140 A 12/2018
(Continued)

OTHER PUBLICATIONS

H. Müller, S. Bosse and K. Turowski, "On the Utility of Machine Learning for Service Capacity Management of Enterprise Applications," 2019 15th International Conference on Signal-Image Technology & Internet-Based Systems (SITIS), Sorrento, Italy, 2019, pp. 274-281, doi: 10.1109/SITIS.2019.00053 (Year: 2019).*

(Continued)

*Primary Examiner* — Mehmet Yesildag
*Assistant Examiner* — Jeremy L Gunn
(74) *Attorney, Agent, or Firm* — Amin, Turocy & Watson, LLP

(57) ABSTRACT

Systems, computer-implemented methods, and/or computer program products facilitating a process to monitor and evaluate the effects of an artificial intelligence (AI) model on enterprise performance metrics are provided. According to an embodiment, a computer implemented method can comprise determining a technical issue of candidate technical issues associated with an artificial intelligence model that correlates to a change associated with a performance metric, wherein the determination is based on using a first data model that defines first relationships between the key performance metrics and candidate technical issues and second relationships between the candidate technical issues and candidate solutions. The method further comprises determining a solution for the technical issue using the data model and recommending or automatically implementing the solution. The method further provides for updating/refining the data model over time using continuous learning based on evaluating whether and how implemented solutions impact the relevant performance metrics.

20 Claims, 11 Drawing Sheets

(56) References Cited

U.S. PATENT DOCUMENTS

| | | | |
|---|---|---|---|
| 8,788,452 | B2 | 7/2014 | Stoneking et al. |
| 11,544,621 | B2 * | 1/2023 | Chen .................. G06F 16/22 |
| 11,809,267 | B2 * | 11/2023 | Gusat ................ G06F 11/0709 |
| 2009/0112932 | A1 | 4/2009 | Skierkowski et al. |
| 2013/0132108 | A1 | 5/2013 | Solilov et al. |
| 2014/0156568 | A1 * | 6/2014 | Ganguly .......... G06Q 10/0637 |
| | | | 706/12 |
| 2016/0034918 | A1 | 2/2016 | Bjelajac et al. |
| 2016/0328641 | A1 * | 11/2016 | AlSaud .................. G06N 3/08 |
| 2020/0065208 | A1 | 2/2020 | Vijendra et al. |
| 2020/0210924 | A1 * | 7/2020 | Ghosh ................... G06N 5/022 |
| 2020/0387565 | A1 * | 12/2020 | Caglar .................. G06N 3/082 |
| 2021/0081837 | A1 * | 3/2021 | Polleri .................. G06N 5/022 |
| 2021/0133162 | A1 * | 5/2021 | Arnold ................. G06N 20/00 |
| 2022/0308977 | A1 * | 9/2022 | Slinger .............. G06F 11/3428 |

FOREIGN PATENT DOCUMENTS

| | | |
|---|---|---|
| CN | 110232403 A | 9/2019 |
| CN | 110599041 A | 12/2019 |
| CN | 112860973 A | 5/2021 |
| CN | 112990423 A | 6/2021 |
| KR | 20180115144 A | 10/2018 |
| TW | I712981 B | 12/2020 |
| WO | 2016161432 A1 | 10/2016 |
| WO | WO-2021051031 A1 * | 3/2021 .......... G06F 11/3003 |

OTHER PUBLICATIONS

Álvarez et al., "Tactical Business-Process-Decision Support based on KPIs Monitoring and Validation", Computers in Industry, vol. 102, pp. 23-39 Nov. 2018, 17 pages.

Iversen, et al., "Business Models and KPIs as Drivers for Drilling Automation", SPE Intelligent Energy International Conference and Exhibition, Sep. 2016, 15 pages.

Zhang | "Organizational Factors Affecting Successful Implementation of Chatbots for Customer Service", Masters Thesis, University of Oslo, Spring, 2020, 61 pages.

Brito, et al.| "A Hybrid AI Tool to Extract Key Performance Indicators from Financial Reports for Benchmarking," DocEng '19, Sep. 23-26, 2019, https://doi.org/10.1145/3342558.3345420, 5 pages.

Mell, et al. | "The NIST Definition of Cloud Computing," Recommendations of the National Institute of Standards and Technology, NIST Special Publication 800-145, Sep. 2011, 7 pages.

Office Action received for Taiwanese Patent Application Serial No. 111120162 dated Jun. 13, 2023, 4 pages.

Office Action received for Taiwanese Patent Application Serial No. 11220940640 dated Sep. 20, 2023, 4 pages.

* cited by examiner

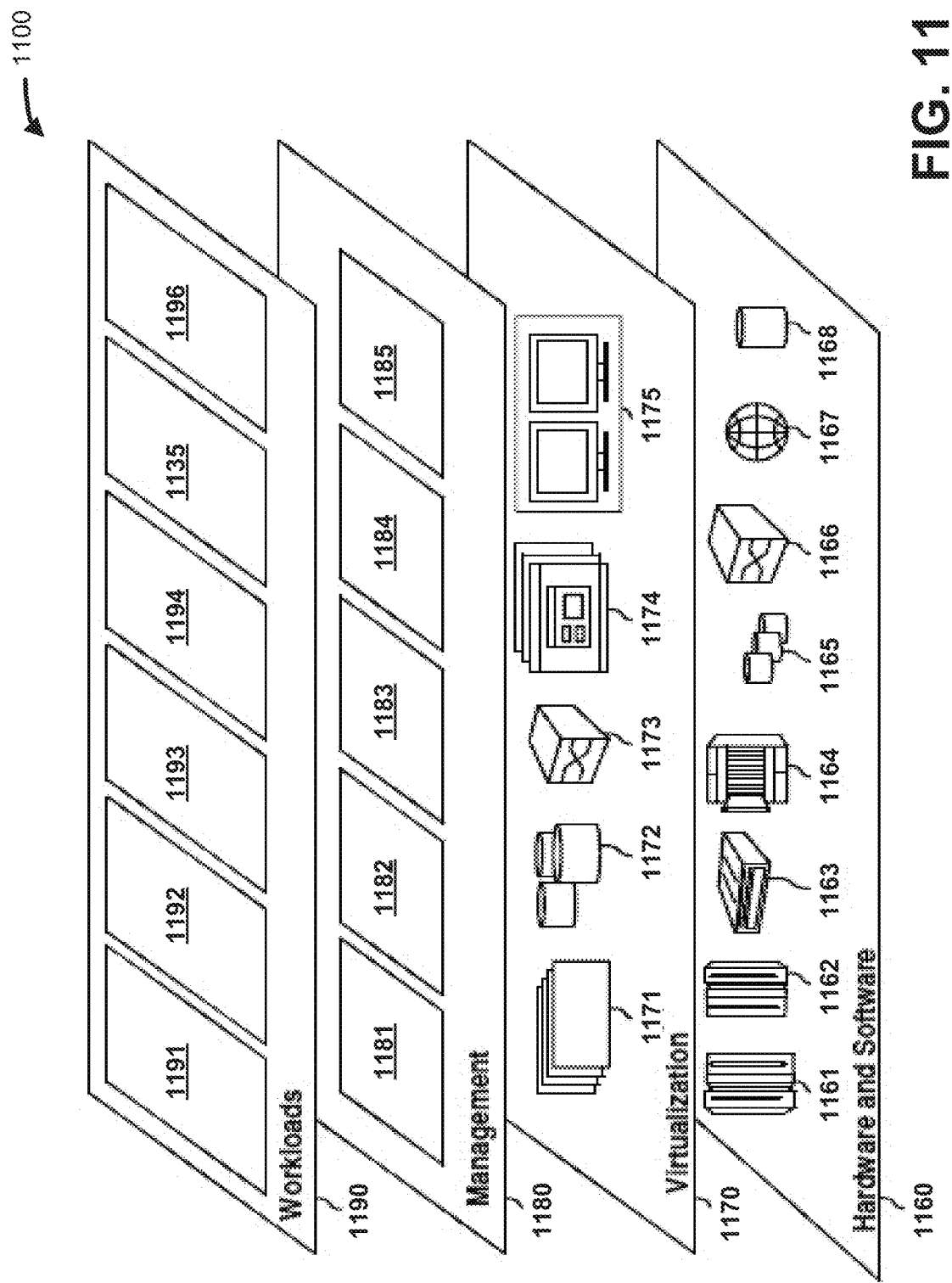

EVALUATING EFFECTS OF AN ARTIFICIAL INTELLIGENCE MODEL ON ENTERPRISE PERFORMANCE OBJECTIVES

BACKGROUND

Artificial intelligence (AI) software solutions have been increasingly adopted in many fields such as healthcare, human resources and/or customer service. From reducing administrative burdens to supporting precision medicine, these analytical tools are showing promise across clinical, financial, and operational domains. The integration of AI solutions into business enterprise processes are expected to positively impact business metrics, such as reduce cost, improve customer service, increase productivity, increase end-user satisfaction and many more.

However, when an AI project is initiated, discussions slide fast from the business requirements and metrics to the immediately critical data and model features. Business metrics are only viewed as back-of-the-envelope (optimistic) estimates until the AI solution gets into pilot phase, after extensive efforts and expenses. For example, when an AI model is used for generating automated recommendations or for automated self-help services, such as a chatbot AI, an understanding of how the AI model impacts business outcomes is not available from the start. The business integration gap stems from the fact that native AI model performance metrics, such as accuracy and recall, are not directly applicable in computing the AI model's impact on business key performance indicators (KPIs), such as cost savings, customer retention rate, and so one. For example, in the context of evaluating the performance of a chatbot AI used by an online business platform, a report indicating that the chatbot interactions are handled with over 90% accuracy does not say much about the business outcome (e.g., whether usage of the chatbot improves customer retention), nor how the business outcome will change if some business conditions change. Thus, there is a need for techniques to specifically address the interplay between AI model and business KPIs after the AI model is deployed in the field.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate monitoring and evaluating effects of an artificial intelligence model on enterprise performance metrics.

According to an embodiment, a system can comprise a memory that stores computer executable components and a processor that executes the computer executable components stored in the memory. The computer executable components can include a detection component that detects a change associated with a performance metric included amongst performance metrics tracked for an enterprise system in association with usage of an AI model by the enterprise system. The performance metrics can include enterprise performance metrics related to one or more defined business objectives of the enterprise and model performance metrics related to one or more defined performance objectives of the AI model. The computer executable components can further include a correlation component that determines a technical issue associated with the AI model that correlates to the change using data model that defines first relationships between the performance metrics (e.g., between the enterprise and AI model performance metrics) and candidate technical issues associated with the AI model.

In some implementations, the data model further defines second relationships between the candidate technical issues and candidate solutions for the candidate technical issues, and wherein the computer executable components can further comprise a remediation component that determines a solution for the technical issue using the data model. The computer executable components can further comprise a recommendation component that generates a recommendation identifying the solution and provides the recommendation to one or more entities associated with the enterprise system or the AI model. In some embodiments in which the solution comprises a configuration change to a configuration of the AI model, and the computer executable components can further comprise a model updating component that updates the AI model according to the configuration change, resulting in an updated AI model, wherein based on the updating, the enterprise system uses the updated AI model instead of the AI model.

Additionally, or alternatively, the computer executable components can further comprise a tracking component that determines one or more new measures of the performance metric following execution of the solution, and a learning component that determines whether and how the solution impacts the change based on the one or more new measures of the performance metric. In some implementations of these embodiments, the computer executable components further comprise a schema evaluation component that determines one or more adjustments to the data model based on whether and how the solution impacts the change, and a schema updating component that updates the data model to comprise the one or more adjustments.

In some embodiments, elements described in the disclosed systems and methods can be embodied in different forms such as a computer-implemented method, a computer program product, or another form.

DESCRIPTION OF THE DRAWINGS

FIG. 11 illustrates a block diagram of a plurality of example, non-limiting abstraction model layers, in accordance with one or more embodiments described herein.

DETAILED DESCRIPTION

Figure 1:
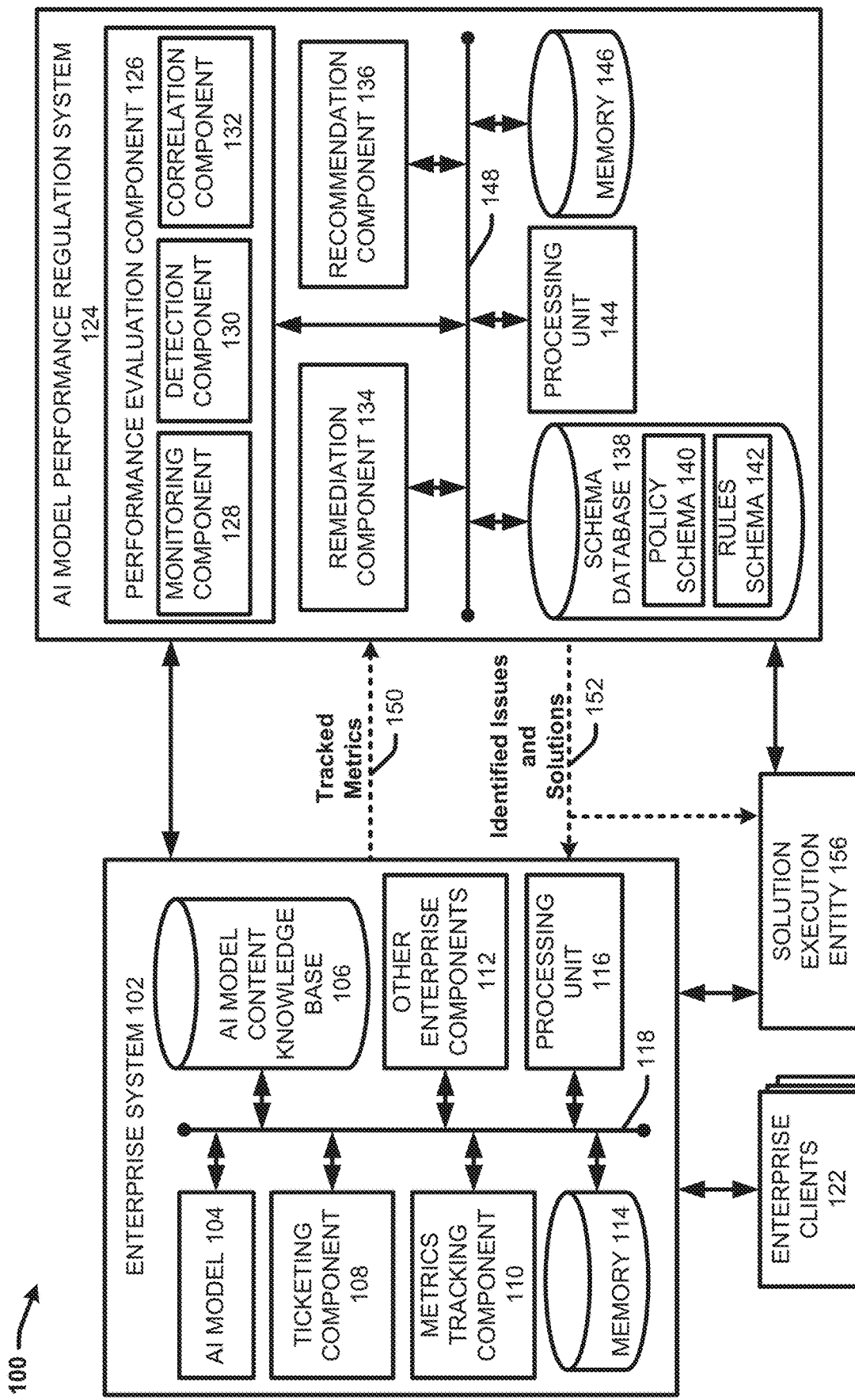
FIG. 1 illustrates a block diagram of an example, non-limiting system that can facilitate monitoring and evaluating effects of an AI model on enterprise performance metrics, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

As discussed above, the integration of AI solutions into business processes can be accompanied by one or more drawbacks. These drawbacks can include difficulty in assessing how usage of an AI model or a product integrating an AI model effects one or more business objectives following deployment, and further determining how to adjust the model itself (e.g., model parameters, continued training strategies) and/or implementation strategies to improve the one or more business objectives. The existing automation for AI performance evaluation must me expanded with support for projection of enterprise KPIs and metrics, and recommendations for improving impact. Current enterprise AI platforms provide a set of integrated resources and tools for development, training and evaluation of AI models. However, the metrics used for the model evaluation are solely based on the technical performance of the AI model, such as accuracy, recall and specificity.

The disclosed techniques address the AI model business integration gap discussed above via systems and methods that monitor and detect trends in defined business KPIs, correlate these trends to technical issues associated with the AI model, and further correlate these technical issues with potential technical solutions. To facilitate this end, the disclosed technique can employ defined policy schema for the enterprise that defines specific business and AI model KPIs that are regularly measured and monitored for an enterprise system in association with usage of an AI model. The disclosed techniques further employ a defined graph-based data model that defines relationship mappings between different KPIs, technical issues and potential solutions. The identified issues and solutions can further be recommended for implementation and/or automatically executed. The disclosed techniques further provide a continuous learning regime via which the system employs machine learning techniques to learn whether and how implemented solutions/changes to the AI model parameters, AI model training, AI model content knowledge base (KB) and so on impact the business KPIs, and further modifies/update the policy schema and/or the graph-based data model accordingly.

The disclosed techniques help AI developers refine relevant targets for model improvement and provide enterprise owners/managers with accurate benchmarks regarding the impact of an AI model solution on the business KPIs. In addition, the disclosed techniques provide recommendations to improve the impact.

In various embodiments, the disclosed techniques can be applied to an AI chatbot used by an online merchant or service provider to perform some automated customer service interactions. Chatbots are software programs created to engage with users automatically. A chatbot can respond proactively to messages containing specific words or phrases by offering a predefined response. It could also use natural language processing (NLP) and machine learning to analyze and understand an incoming message and provide an appropriate response in real-time. In accordance with these embodiments, the chatbot can integrate an artifact corpus comprises of self-help documents, product documentation, and problem determination step by step flows or videos. In one or more example implementations as applied to usage of a chatbot by an enterprise system, assume the enterprise system is interested in evaluating the following business metrics: 1.) request deflection, 2.) customer satisfaction, and 3) resolution effectiveness. A request deflection refers to when the end of the end of the dialog is reached and the user is referred to a relevant artifact, or when the user is escalated to a human agent. Customer satisfaction of the resolution returned may be closely tied to their skill level. For example, some end users may prefer video artifacts so they can follow the steps along with visuals provided to demonstrate the resolution. Additional components for satisfaction can include the number of conversation steps and time taken to formulate a response iteration. In view of these business metrics, some AI model KPIs that can be correlated to thereto include but are not limited to the following: 1.) length of conversation, 2.) maximum iteration response time, 3) hit in skill-relevant artifact, 3) hit in expected artifact list, and 5.) solution effectiveness. A higher-level KPI can be defined for user satisfaction, as a combination of KPIs 1-3 above. Once the interdependencies between the business KPIs and AI model KPIs have been defined and modeled initially, the disclosed techniques can provide for evaluating the impact of the AI model on the business objectives during runtime.

The disclosed techniques provide significant technical advantages to both the enterprise AI consultant or developer and the enterprise management. In this regard, from the enterprise AI developer/consultant point of view, the disclosed techniques can proactively provide an early understanding of the business KPI interconnect that surrounds the target AI project. Such knowledge can help select algorithms, scale annotations, define accuracy targets, and additional answer content. Not the least, such knowledge can help assess the risk of failing to move from pilot stage and into large scale deployment. From the enterprise management point of view, such integration provides multiple tangible and non-tangible benefits. For example, one benefit includes increased confidence that the AI project is coupled to the business model from the inception stage. Another benefit includes real-time interpretation of the AI solution performance progress into the business performance. Another example benefit includes an awareness of how the enterprise infrastructure/services extensions that are required to integrate with the AI solutions, such as extensions of ticket record to collect information about AI model recommendations.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 500 illustrated at FIGS. 1 and 5, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 to 6 and/or with other figures described herein.

Turning now to FIG. 1, illustrated is an example, non-limiting system 100 that can facilitate monitoring and evaluating effects of an AI model on enterprise performance metrics, in accordance with one or more embodiments described herein. The non-limiting system 100 can include an enterprise system 102 and an AI model performance regulation system 124.

Generally, the enterprise system 102 can correspond to one or more computing systems employed by a business or enterprise to perform one or more enterprise related tasks, including at least one task that is performed or facilitated by an AI model 104. The type of the enterprise system 102 and the specific task or tasks that the AI model 104 is configured to perform can vary. For instance, in some embodiments, the enterprise system 102 can correspond a web-based platform (e.g., a website, a web-application, a mobile application, etc.) employed by an online merchant to provide goods and/or services to customers, also referred to as clients or users. With these embodiments, the enterprise clients 122 can correspond to the entities that access and employ the enterprise system 102 via one or more networks (e.g., the Internet). As used herein, the terms "entity," "user entity" and/or "client," and the like can be or include a machine, device, component, hardware, software, smart device or, in some embodiments, a human.

For example, in some embodiments the enterprise system 102 can correspond to an online merchant or service provider, a social media system, a streaming video platform, or another type of web-based business. In some implementations of these embodiments, the AI model 104 may include or correspond to a chatbot that the web-based business uses to automate certain interactions with customers. With these embodiments, the enterprise clients 122 can correspond to the client devices employed by the customer entities to access and interface with the web-based platform. In other implementations, the AI model 104 may include or correspond to one or more AI models adapted to perform various back-end tacks related to data pre-processing, service optimization, automated recommendations, and various other business-related tasks capable of being automated by one or more AI models. In another example, the enterprise system 102 may correspond to one or more computing systems employed by a healthcare organization to perform various tasks related to operations of the healthcare organization, such as managing and optimizing delivery of medical care, performing clinical evaluations, facilitating access and review of medical images, and the like. According to this example, the AI model 104 may be configured to perform a variety of automated tasks related to managing and optimizing the delivery of medical care, processing medical images (e.g., performing diagnosis classification, organ segmentation, and other medical image processing tasks), and other operations of the healthcare organization.

In this regard, the AI model 104 can include or correspond to essentially any type of AI/ML model or adapted to perform one or more defined tasks that are intended to achieve and/or facilitate achieving one or more desired business objectives of the enterprise system 102. Although a single AI model 104 is illustrated, it should be appreciated that the AI model 104 can correspond to one or more AI/ML models. For example, the AI model 104 can also include or correspond to a plurality of AI/ML models that perform a set of different tasks that are intended to achieve and/or facilitate achieving one or more desired business objectives of the enterprise system 102. The business objectives will vary depending on the type of the enterprise system 102 and the task or tasks that the AI model 104 is adapted to perform. For example, in implementations in which the enterprise system 102 corresponds to an online merchant or service provider and the AI model 104 corresponds to a chatbot adapted to automate certain customer service interactions, the business objectives targeted via usage of the chatbot could include improving customer service, reducing costs attributed to usage of live agents, and improving overall customer engagement and satisfaction. In another example implementation in which the enterprise system 102 corresponds to a hospital system that uses one or more AI models to provide clinical decision support to clinicians, the business objectives may include improved clinician efficiency and performance accuracy, increased quality of patient care, reduced length of patient inpatient stay, and so on.

The AI model performance regulation system 124 can include a computing system that receives and evaluates tracked metrics 150 generated by the enterprise system 102 over time related to both business performance metrics and AI model performance metrics. The terms "business performance metrics," "enterprise performance metrics," "business KPIs," "enterprise KPIs" or the like are used herein to refer to defined performance metrics that are used to evaluate the performance of the enterprise system 102 with respect to one or more defined business objectives/goals of the enterprise. The terms "AI model performance metrics," "model performance metrics," "AI model KPIs," and the like are used herein to refer to defined performance metrics that are used to evaluate the technical performance of AI model as used by the enterprise system 102.

For example, as applied to usage of a chatbot AI by an online merchant or service provider to automate some customer service interactions, the business objectives may include, improving customer service, saving cost, and improving customer engagement and satisfaction. Some example business KPIs that may be used to evaluate the performance of the chatbot relative to these business objectives/goals can include, but are not limited to: response time, availability, answer quality, total tickets served by human agents, total tickets served by the chatbot, total tickets resolved, customer feedback (e.g., a measure of positive feedback and negative feedback associated with the online merchant overall and/or usage of the chatbot), customer rating (e.g., reflecting the customer's degree of satisfaction associated with the online merchant overall and/or usage of the chatbot), and repeat repair rate (e.g., regarding the number repair attempts performed by the merchant before a customer issue/problem is resolved). Some example, AI model KPIs that may be used to evaluate the technical performance of the AI chatbot as used by the enterprise system 102 may include, but are not limited to: usage statistics (e.g., number of chatbot sessions, frequency of chatbot session, number/frequency of chatbot sessions per customer, duration of chatbot sessions, etc.), feedback per session (e.g., reflecting a measure of quality of the chatbot performance per session), first time fix rate (e.g., a measure of whether the chatbot solved a customer's issue or question with a its first provided solution/answer), average message exchange length, bounce rate (e.g., rate at which chatbot sessions are abandoned or closed by the customer, average session time/duration, and fallback rate (e.g., frequency of occurrence of a same unresolved user question/issue), number of users per unit of time, number of new users, and number of engaged users. Some additional AI model KPIs that can also more directly reflect the technical performance of an AI chatbot may also include, but are not limited to, the number of entities extracted per user utterance, number of symptoms extracted per user utterance, number of good matches returned by graph search (e.g., as determined via a matching score relative to a defined index), and number of options presented to the user.

It should be appreciated that the various business and AI model KPIs discussed above are merely exemplary and that various other metrics may be used to evaluate the performance of a chatbot AI and other types of AI models from the business perspective and the technical perspective. In this regard, the specific business and AI model KPIs that are measured and tracked in the tracked metrics 150 will vary depending on the type of the business/enterprise, the specific goals and objectives of the business/enterprise, and the specific task or task that the AI model is adapted to perform. In addition, business KPIs and AI model KPIs are not mutually exclusive. In this regard, depending on context, some measurable KPIs may be considered both a business KPI and an AI model KPI.

Generally, the AI model performance regulation system 124 provides for evaluating whether and to what degree the AI model 104 contributes to achieving the desired business objectives based on the tracked metrics 150. As described in greater detail below, this involves correlating trends in the business KPIs with trends in the AI model KPIs based on defined rules and/or policies and/or one or more machine learning techniques. For example, as applied in the context of a chatbot used by an online merchant to perform some automated customer service agent interactions, the AI model performance regulation system 124 may detect an increase in negative user feedback based on the tracked metrics 150. The AI model performance regulation system 124 can further correlate this trend in the business KPIs to one or more other trends in the AI model KPIs, such as an increased bounce rate. The AI model performance regulation system 124 further provides for identifying technical issues associated with the AI model 104 that are or may be correlated to negative trends in the business performance metrics. For example, the AI performance regulation system 124 can further examine additional information associated with the negative user feedback such as content of the chatbot sessions, types of questions and chatbot responses provided that are associated with the negative user feedback and the bounced sessions to determine or infer what technical issues associated with the chatbot are or may be attributed to the negative user feedback and the increased bounce rate. For instance, the AI model performance regulation system 124 may determine that the chatbot repeatedly fails to provide the correct response to a same or similar customer question. The AI performance regulation system 124 may further correlate this trend in the measured KPIs to a learning issue associated with the chatbot AI (e.g., the model did not learn from the negative customer feedback and increased bounce rate associated with the line of question and answering).

The AI model performance regulation system 124 further provides for determining solutions to the technical issues and recommending and/or automatically executing the solutions. In the embodiment shown, information regarding the technical issues and the corresponding solutions is represented as identified issues and solutions 152. In this regard, the identified issues and solutions 152 can include information identifying one or more identified technical issues associated with the AI model 104 that the AI model performance regulation system 124 has identified as being correlated to a negative trend associated with the business and/or AI model KPIs included in the tracked metrics 150. The identified issues and solutions 152 can also include information identifying or indicating the determined solution or solutions to the technical issues. As illustrated in system 100, the AI model performance regulation system 124 can provide information regarding the identified issues and solutions 152 to the enterprise system 102 for usage by the enterprise system 102. Additionally, or alternatively, the performance regulation system 124 can provide the identified issues and solutions 152 to an appropriate solution execution entity 156 for implementing/executing the recommended solution. For example, the solution execution entity 156 may correspond to 156 a solution designer, an owner/developer of the AI model 104, an enterprise system manager, a content manager associated with managing the AI model 104 execution, and the like. For instance, in accordance with the chatbot learning issue example, the AI model performance regulation system 124 may determine that a solution to the technical learning issue could include adjusting the chatbot AI's learning coefficient. In some implementations, the AI performance regulation system 124 can inform the enterprise system 102 and/or the entity responsible for controlling/executing model adjustments (e.g., the solution execution entity 156, which may correspond to the AI model developer, manager, etc.) regarding the learning issue and the recommendation to adjust the learning coefficient, and the enterprise system and/or the entity may response accordingly. In other embodiments in which the solution involves an action that can be performed automatically (e.g., adjusting a model parameter, a model threshold, or the like), the AI model performance regulation system 104 can automatically perform the action, as discussed in greater detail infra with reference to FIG. 5.

To facilitate this end, the enterprise system 102 can comprise one or more components, such as AI model 104, AI model content knowledge base 106, ticketing component 108, metrics tracking component 110, other enterprise component 112, memory 114, processing unit 116, and system bus 118., bus 224, determination component 208, analysis component 212 and/or monitoring component 220. The AI model performance regulation system 124 can include performance evaluation component 126, monitoring component 128, detection component 130, correlation component 132, remediation component 134, recommendation component 136, schema database 138, processing unit 144, memory 146 and system bus 148.

The architecture of system 100 can vary. For example, in the embodiment shown, the AI model performance regulation system 124 is depicted as separate system from the enterprise system 102. This configuration is envisioned for implementations in which the process of evaluating the impact of the AI model performance on the enterprise system business objectives is performed by an external system or entity external to the enterprise system 102 (e.g., an entity develops, provides and/or manages the AI model 104 as opposed to the entity that uses the AI model 104 as a product integrated into their business, or the like). However, it should be appreciated that in other embodiments, the enterprise system 102 and the AI model performance evaluation system 124 can be combined. With these embodiments, the combined memory 114 and the memory 146 may be combined and/or the processing unit 116 and the processing unit 144 may be combined.

In one or more embodiments, the enterprise system 102 and/or the AI model performance regulation system 124 can be associated with a cloud computing environment 1050 described below with reference to FIG. 10 and/or with one or more functional abstraction layers described below with reference to FIG. 11 (e.g., hardware and software layer 1160, virtualization layer 1170, management layer 1180 and/or workloads layer 1190). With these embodiments, the enterprise system 102 and/or the AI model performance regulation system 124 (and/or components thereof) can employ one or more computing resources of the cloud computing environment 1050 described below with reference to FIG. 10, and/or with reference to the one or more functional abstraction layers (e.g., quantum software and/or the like) described below with reference to FIG. 11, to execute one or more operations in accordance with one or more embodiments described herein. For example, cloud computing environment 1050 and/or one or more of the functional abstraction layers 1160, 1170, 1180 and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by response generation system 402 and/or components thereof to execute one or more operations in accordance with one or more embodiments described herein. For instance, the enterprise system 102, the AI model performance regulation system 124, and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or other analytical model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein can be capable of being implemented in conjunction with any other type of computing environment now known or later developed.

Cloud computing can be a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that can promote use by heterogeneous thin or thick client platforms (e.g., mobile phones, laptops, and PDAs).

Resource pooling: the provider's computing resources can be pooled to serve multiple consumers using a multi-tenant model, with different physical and virtual resources dynamically assigned and reassigned according to demand. There can be a sense of location independence in that the consumer generally can be without control and/or knowledge over the exact location of the provided resources but can be able to specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning often can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems or storage, but can have control over the deployed applications and possibly application hosting environment configurations.

Infrastructure as a Service (IaaS): the capability provided to the consumer can be to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models can be as follows:

Private cloud: the cloud infrastructure can be operated solely for an organization. The cloud infrastructure can be managed by the organization and/or a third party and can exist on-premises or off-premises.

Community cloud: the cloud infrastructure can be shared by one or more organizations and can support a specific community that can have shared concerns (e.g., mission, security requirements, policy and/or compliance considerations). The cloud infrastructure can be managed by the organizations or a third party and can exist on-premises or off-premises.

Public cloud: the cloud infrastructure can be made available to the general public or to a large industry group and can be owned by an organization selling cloud services.

Hybrid cloud: the cloud infrastructure can be a composition of two or more clouds (private, community or public) that can remain unique entities but can be bound together by standardized or proprietary technology that can enable data and/or application portability (e.g., cloud bursting for load-balancing among clouds).

A cloud computing environment can be service-oriented with a focus on statelessness, low coupling, modularity and/or semantic interoperability. At the heart of cloud computing can be an infrastructure that can include a network of interconnected nodes.

Moreover, the non-limiting system 100 can be associated with or can be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, the non-limiting system 100 can be employed to use hardware and/or software to solve problems that are highly technical in nature and/or that are not abstract.

Regardless of the architecture deployment of system 100 (and other systems described herein), memory 114 and/or memory 146 can store one or more computer and/or machine readable, writable and/or executable components and/or instructions that, when executed by processing unit 117 and/or processing unit 144 (e.g., a classical processor, a quantum processor and/or like processor), can facilitate performance of operations defined by the executable component(s) and/or instruction(s). For example, memory 114 can store computer and/or machine readable, writable and/or executable components and/or instructions that, when executed by processing unit 116, can facilitate execution of the various functions described herein relating to the enterprise system 102, the AI model 104, the ticketing component 108, the metrics tracking component 110, and/or the other enterprise components 112, as described herein with or without reference to the various figures of the one or more embodiments. Likewise, memory 146 can store computer and/or machine readable, writable and/or executable components and/or instructions that, when executed by processing unit 144, can facilitate execution of the various functions described herein relating to the AI model performance regulation system 124, the performance evaluation component 126, the remediation component 134, the recommendation component 136 and other associated components described herein.

Memory 114 and/or memory 146 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 114 and memory 146 are described below with reference to system memory 904 and FIG. 9.

Processing unit 116 and/or processing unit 144 can comprise one or more types of processors and/or electronic circuitry (e.g., a classical processor, a quantum processor and/or like processor) that can implement one or more computer and/or machine readable, writable and/or executable components and/or instructions that can be stored in memory 114 and/or memory 146 respectively. For example, processing unit 116 and/or processing unit 144 can perform various operations that can be specified by computer and/or machine readable, writable and/or executable components and/or instructions including, but not limited to, logic, control, input/output (I/O), arithmetic and/or the like. In one or more embodiments, processing unit 116 and/or processing unit 144 can comprise one or more of a central processing unit, multi-core processor, microprocessor, dual microprocessors, microcontroller, System on a Chip (SOC), array processor, vector processor, quantum processor and/or another type of processor. Additional examples of processing unit 116 and/or processing unit 144 described below with reference to processing unit 906 and FIG. 9.

The respective components of the enterprise system (e.g., the AI model 104, the AI model content knowledge bases 106, the ticketing component 108, the metrics tracking component 110, the other enterprise component 112, the memory 114 and the processing unit 116) as described herein can be communicatively, electrically, operatively and/or optically coupled to one another via a system bus 118 to perform functions of the enterprise system 102 and/or any components coupled therewith. Likewise, the respective components of the AI model performance regulation system 124 (e.g., the performance evaluation component 126, the remediation component 134, the recommendation component 136, the schema database 138, the processing unit 144 and the memory 146) as described herein can be communicatively, electrically, operatively and/or optically coupled to one another via another system bus 148 to perform functions of AI model performance regulation system 124 and/or any components coupled therewith. System bus 118 and/or system bus 148 can comprise one or more of a memory bus, memory controller, peripheral bus, external bus, local bus, quantum bus and/or another type of bus that can employ various bus architectures. Further examples of system bus 118 and/or system bus 144 are described below with reference to system bus 908 and FIG. 9. The examples of system bus 118 and/or system bus 148 can be employed to implement any one or more embodiments described herein.

The enterprise system 102, the enterprise clients 122, the solution execution entity 156 and the AI model performance regulation system 124 can comprise any type of component, machine, device, facility, apparatus and/or instrument that can comprise a processor and/or can be capable of effective and/or operative communication with a wired and/or wireless network. All such embodiments are envisioned. For example, the enterprise system 102, the enterprise client 122, the solution execution entity 156 and the AI model performance regulation system 124 can comprise a server device, a computing device, a general-purpose computer, a special-purpose computer, a quantum computing device (e.g., quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, multimedia players and/or another type of device.

The enterprise system 102, the enterprise clients 122, the solution execution entity 156 and the AI model performance regulation system 124 can be coupled (e.g., communicatively, electrically, operatively, optically and/or the like) to one another and/or one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In one or more embodiments, the enterprise system 102, the enterprise clients 122, the solution execution entity 156 and the AI model performance regulation system 124 can be coupled (e.g., communicatively, electrically, operatively, optically and/or the like) to one or more external systems, sources and/or devices (e.g., classical and/or quantum computing devices, communication devices and/or the like) via a network.

In one or more embodiments, a network can comprise one or more wired and/or wireless networks, including, but not limited to, a cellular network, wide area network (WAN) (e.g., the Internet), or local area network (LAN). For example, the enterprise system 102, the enterprise clients 122, the solution execution entity 156 and the AI model performance regulation system 124 can communicate (and vice versa) with one another and/or one or more external systems, sources and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, response generation system 402 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that can facilitate communicating information among response generation system 402 and external systems, sources and/or devices (e.g., computing devices, communication devices and/or the like).

With reference to the components of the enterprise system 102, as discussed above, the AI model 104 can include or correspond to essentially any type of AI/ML model or adapted to perform one or more defined tasks that are intended to achieve and/or facilitate achieving one or more desired business objectives of the enterprise system 102. The AI model content knowledge base 106 can include content employed by the AI model 104 to perform or facilitate performing the defined task or tasks. For example, in implementations in which the enterprise system 102 corresponds to a chatbot adapted to automate certain customer service interactions, the AI model content knowledge base 106 can include indexed information defining the appropriate chatbot responses to different user questions or inquires. The responses can include text data, image data, audio data, hyperlinks to internal enterprise system content and/or applications, hyperlinks to external content and/or applications (e.g., provided by one or more external systems/devices access via the Internet or another communication network), and the like. In another example implementation in which the AI models 104 corresponds to a clinical inferencing model adapted to identify potential adverse events in the clinical workflow and provide suggestions to minimize or prevent the adverse events, the AI model content knowledge base 106 can include indexed information defining the appropriate clinical response to minimize or prevent the potential adverse events. In some implementations, the AI model content knowledge base 106 can be stored in memory 114. Additionally, or alternatively, the AI model content knowledge based can be stored in external memory that is accessible to the enterprise system 102 (e.g., via one or more wired or wireless communication networks).

In various embodiments, the AI model 104 can be adapted to learn autonomously or implicitly over time based on feedback regarding its performance accuracy and specificity. With these embodiments, the AI model content knowledge base 106 can also aggregate and store historical information regarding usage of the AI model 104 and its performance feedback that can be used by the AI model 104 to implicitly learn over time. For example, as applied to the chatbot scenario, the historical usage information can include information regarding past chatbot sessions, including but not limited to, the content of the sessions (e.g., the chatbot provided content and the user/customer questions and responses), the customer/user identity associated with the session, the timing/duration of the session, whether a ticket was created, whether the ticket was resolved, whether/when and why the chatbot connected the customer to a live agent, and feedback received regarding the session. The feedback can include for example, user/customer provided feedback regarding their satisfaction with the chatbot session, such as a performance rating, information indicating whether their questions/issues were resolved, and the like.

In implementation in which the AI model 104 corresponds to an AI chatbot, the ticketing component 108 can correspond to an internal ticketing system/software employed by the enterprise system to track and organize customer service requests. For example, the ticketing component 108 can generate tickets for customers issues/requests received via chatbot sessions. The ticketing component 108 can also track information regarding the user identity associated with the ticket, the customer service request for which the ticket was created, when/whether the ticket was resolved, and whether the ticket was served by the chatbot or a human agent.

The other enterprise component 112 can include or correspond to the various other applications, features and functionalities associated with the enterprise system 102 aside from the AI model 104. For example, as applied to an online merchant or service provider, the other enterprise component 112 can correspond to the various primary features and functionalities provided by the online merchant or service provider, such as electronic commerce applications, billing applications, rating systems, social media functions, user profile/account systems, and the like. In some embodiments, the AI model 104 can access and employ the other enterprise component 112 in association with providing responses and/or generating inferences.

The metrics tracking component 110 can measure and generate the tracked metrics 150 for the enterprise system 102. As noted above, the tracked metrics 150 can include both business KPIs and AI model KPIs. The metrics tracking component 110 can further store the tracked metrics 150 in memory 114 and/or provide the tracked metric 150 to the AI model performance regulation system 124. The frequency at which the metrics are measured and reported by the metrics tracking component 110 to the AI model performance evaluation regulation system 124 can also be predefined (e.g., every 30 minutes, every hour, once a day, once a week, etc.). The specific metrics that are tracked by the metrics tracking component 110 and the rules for calculating the metrics can be predefined and stored in memory 114 or another suitable memory accessible to the metrics tracking component 110. For example, in implementations in which the AI model 104 comprises a chatbot adapted to perform some automated customer service interactions, the metrics tracking component 110 can measure and generate the tracked metrics 150 based on usage data and feedback received in association with each chatbot session that can be stored in the AI model content knowledge base 106. Additionally, or alternatively, the metrics tracking component 110 can calculate/measure the business KPIs and AI model KPIs based on data generated by the ticketing component 108. For instance, some example business KPIs and/or AI model KPIs that can be measured/calculated based on chatbot session usage data, feedback data and/or the ticket data generated by the ticketing component 108 can include but are not limited to: first time fix rate, repeat repair rate, fallback rate, customer satisfaction feedback (e.g., a binary value or a rating), average messages per session, average time per chatbot session, number of chatbot users (per a defined time period), number of new users (e.g., per a defined time period), number of engaged users (e.g., determined via user response time, via user response frequency, via user response content, or another valuation), and bounce rate. The metrics tracking component 110 can also generate AI model KPIs based on analysis of the chatbot session content tracked and stored for respective chatbot sessions, such as, but not limited to, number of entities extracted from each user utterance, number of symptoms extracted from a user utterance, number of good matches returned by graph search based on natural language understanding (NLU) matching from a defined index (e.g., wherein "good" is determined based on a matching score relative to a defined threshold), and number of options presented to the user.

The metrics tracking component 110 can measure/calculate the KPIs relative to a variety of frames of reference. For instance, with respect to the chatbot example, the metrics tracking component 110 can measure certain KPIs as function of a defined time period, per conversation topic, per chatbot session, per user/customer identity (e.g., wherein some users may repeatedly use the chatbot), and the like. In this regard, in some embodiments, the enterprise system 102 can store information identifying respective users of the enterprise system 102 by a user identifier, a user profile, a user account or the like. The metrics tracking component 110 can further track business and AI model KPIs for respective user identities, such as but not limited to: number of visits per day, frequency of visits (per week or another time period), engagement score, bounce score (reflecting frequency of bounced chatbot sessions), average conversation length, and average feedback rate.

With reference to the components of the AI model performance regulation system 124, the performance evaluation component 126 can provide various functions related to evaluating the performance of the AI model 104 with respect to its impact on the one or more business goals and objectives of the enterprise system. To facilitate this end, the performance evaluation component 126 can include monitoring component 128, detection component 130 and correlation component 132.

The monitoring component 128 can receive and monitor the tracked metrics 150 generated by metrics tracking component 110. In some implementations, the metrics tracking component 110 can calculate/measure and provide the tracked metrics 150 to the monitoring component 128 as they are generated. In other implementations in which the metrics tracking component 110 stores the tracked metrics in memory 114, the monitoring component 128 can extract the tracked metrics 150 from memory 114. In either of these implementations, the monitoring component 128 can aggregate the tracked metrics for the different business KPIs and AI model KPIs as they are received or extracted over time.

The detection component 130 can analyze the tracked metrics 150 to detect trends in the tracked metrics 150. In particular, the detection component 130 can be configured to detect negative trends or changes in the business and/or AI model KPIs that indicate a negative impact on the business goals and objectives of the enterprise system 102. The detection component 130 can also be configured to detect positive trends or changes in the business and AI model KPIs. For example, the detection component 130 can detect positive trends or changes in the KPIs in association with determining whether and to what degree an implemented solution to an identified technical issue improved the relevant KPIs. The specific trends that the detection component 130 is configured to detect will vary depending on the type of the enterprise system 102, the business goals and objective of the enterprise system 102, the policies of the enterprise system 102 and the specific business and AI model KPIs that are included in the tracked metrics. For example, as applied to the chatbot AI implementation, some example trends can include, but are not limited to, a drop in user feedback, a drop in positive user feedback, a drop in number of users per day/week (or another time period), a drop in number of conversations per day/week (or another time period), an increase in negative user feedback, an increase in bouncing rate, and an increase in the length of conversations.

In this regard, a trend can be based on a change in individual KPIs beyond a defined threshold, and/or a change in a combination of two or more KPIs beyond a defined threshold. A trend can also be based on defined priorities between different KPIs and weights for the different KPIs. In various embodiments, the specific trends that the detection component 130 is configured to monitor and detect and the rules/schema for detecting such trends can be predefined for the enterprise system 102 in the schema database 138 via the policy schema 140. In this regard, the policy schema 140 can define the rules and polices (e.g., acceptable thresholds) for correlating measurable changes in the KPIs included in the tracked metrics 150 to negative and positive trends. For example, the policy schema 140 can define acceptable values and/or value ranges for one or more specific business and/or AI model KPIs, wherein the detection component 130 can be configured to identify a negative trend based on the value or value ranges of the measured KPIs dropping below the defined acceptable value thresholds. Likewise, the detection component 130 can identify a positive trend based on the value or value ranges of the measured KPIs being within and/or beyond the defined acceptable value thresholds. Additionally, or alternatively, the policy schema 140 can define acceptable degrees or rates of change for specific business KPIs and/or AI model KPIs, wherein the detection component 130 can detect or declare observance of negative and positive trends based on degree or rate of change in the business and/or AI model KPIs relative to defined threshold change rates. In various embodiments, the policy schema 140 can be initially created/defined by one or more subject matter experts associated with the enterprise system 102 and/or the AI model 104. As discussed in greater detail infra with reference to FIG. 5, in some embodiments, the disclosed systems can further provide for automatically adapting and refining the policy schema 140 during operation via one or more machine learning techniques.

The correlation component 132 can further correlate detected changes in one or more of the tracked metrics 150 that constitute negative (and optionally positive) tends (e.g., as defined based on the policy schema 140) to one or more potential technical issues associated with the AI model 104. The remediation component 134 can further correlate the one or more technical issues to one or more potential solutions to the one or more technical issues. The recommendation component 136 can further generate a recommendation identifying the one or more technical issues and the one or more solutions (e.g., identified issues and solutions 152 data) and provide the recommendation to the enterprise system 102 and/or the solution execution entity 156 for implementing or executing.

To facilitate this end, the correlation component 132 and the remediation component 136 can employ rules schema 142 for the enterprise system and AI model 104 that provide defined rules and/or constraints for correlating different KPIs for which a detected trend is based to the potential technical issues and solutions. For example, in some embodiments, the rules schema 142 can include or correspond to a data model that defines a taxonomy of the tracked metrics 150, including a hierarchy of the different business and AI model KPIs, relationship mappings between the respective business KPIs, the AI model KPIs, defined candidate technical issues, and defined candidate solutions. In various embodiments, the rules schema 142 can be initially created/defined by one or more subject matter experts associated with the enterprise system 102 and/or the AI model 104. As discussed in greater detail infra with reference to FIG. 5, in some embodiments, the disclosed systems can further provide for automatically adapting and refining the rules schema 142 during operation via one or more machine learning techniques.

Figure 2:
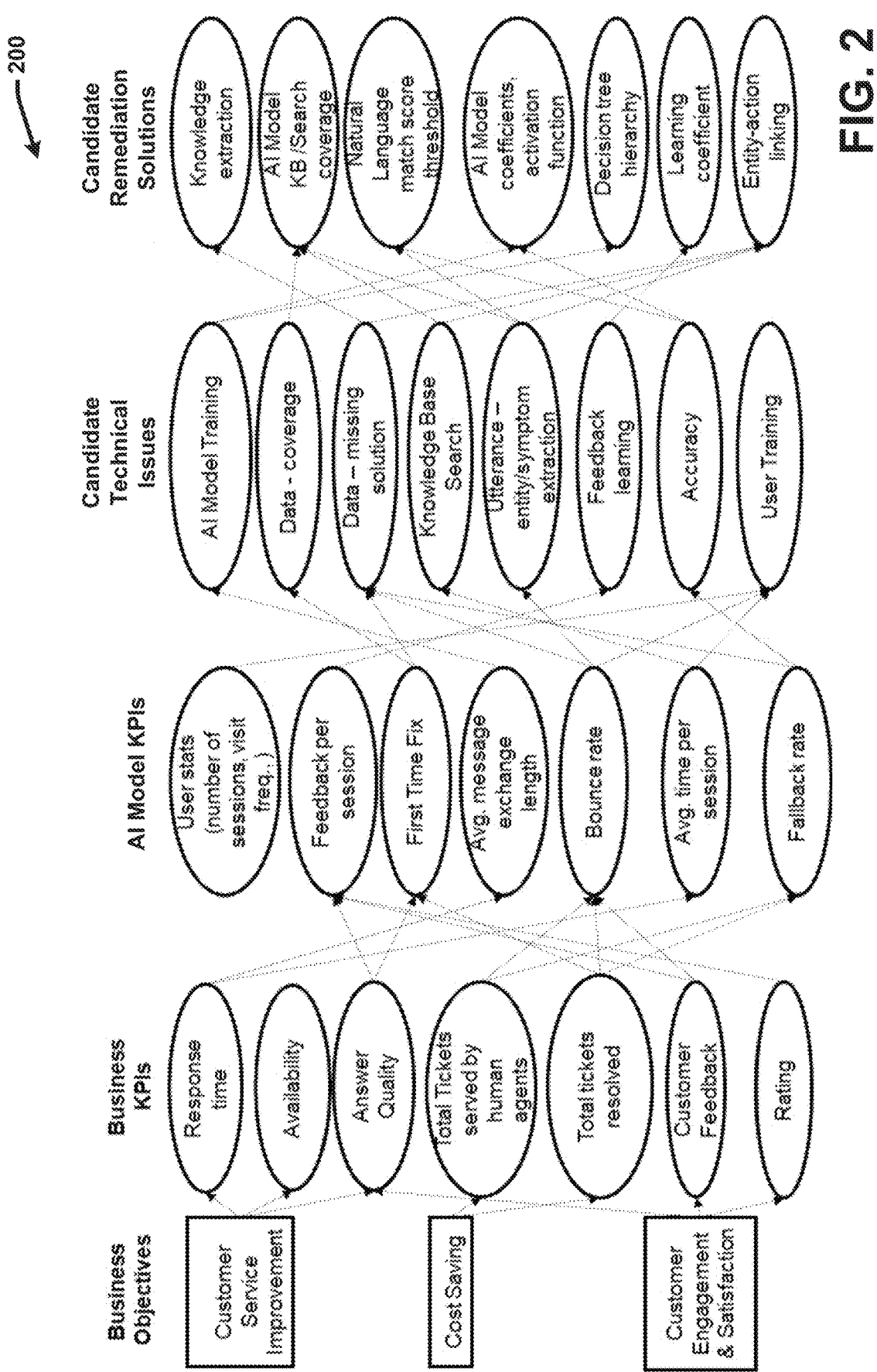
FIG. 2 presents an example data model that defines mappings between enterprise and AI model performance metrics in accordance with one or more embodiments described herein.

FIG. 2 presents an example data model 200 that defines mappings between enterprise/business and AI model performance metrics in accordance with one or more embodiments described herein. The data model 200 also defines mappings between the KPIs and candidate technical issues, as well as mappings between the candidate technical issues and candidate remediation actions.

With reference to FIGS. 1 and 2, data model 200 presents an example data model that can be defined in the rules schema 142 for an enterprise system that employs a chatbot AI with the business objectives of improving customer service, saving cost and improving customer engagement and satisfaction. As illustrated in FIG. 2, the data model 200 defines mappings (provided by the arrowed lines) between defined business KPIs, AI model KPIs, candidate technical issues and candidate remediation actions. In this example, the business KPIs include response time, availability, answer quality, total tickets served by human agents, total tickets resolved, customer feedback and rating. The AI model KPIs include usage statistics (e.g., number of sessions, visit frequency, etc.), feedback per session, first time fix (e.g., whether the chatbot resolved the customers issues/question after one session), average message length, bounce rate, average time per session and fallback rate. The candidate technical issues associated with the AI model in this example can include (but are not limited to) AI model training, data coverage (e.g., with respect to training data and/or the data used by chatbot AI included in the AI model content knowledge base 106), knowledge base (KB) search (e.g., indicating an issue with the KB mappings), utterance extraction issues related to entity/symptom extraction, chatbot accuracy, and user training (e.g., indicating an issue with training users/customers how to better engage with the chatbot). The candidate remediation solutions include (but are not limited to): improving knowledge extraction function of the chatbot, improving/adjusting the AI model KB/search coverage, changing the natural language match score threshold, changing the AI model coefficients and/or activation function, changing the model decision tree hierarchy (e.g., in implementation in which the chatbot employs a decision tree function), adjusting the learning coefficient, and changing the entity-action linking.

Figure 3:
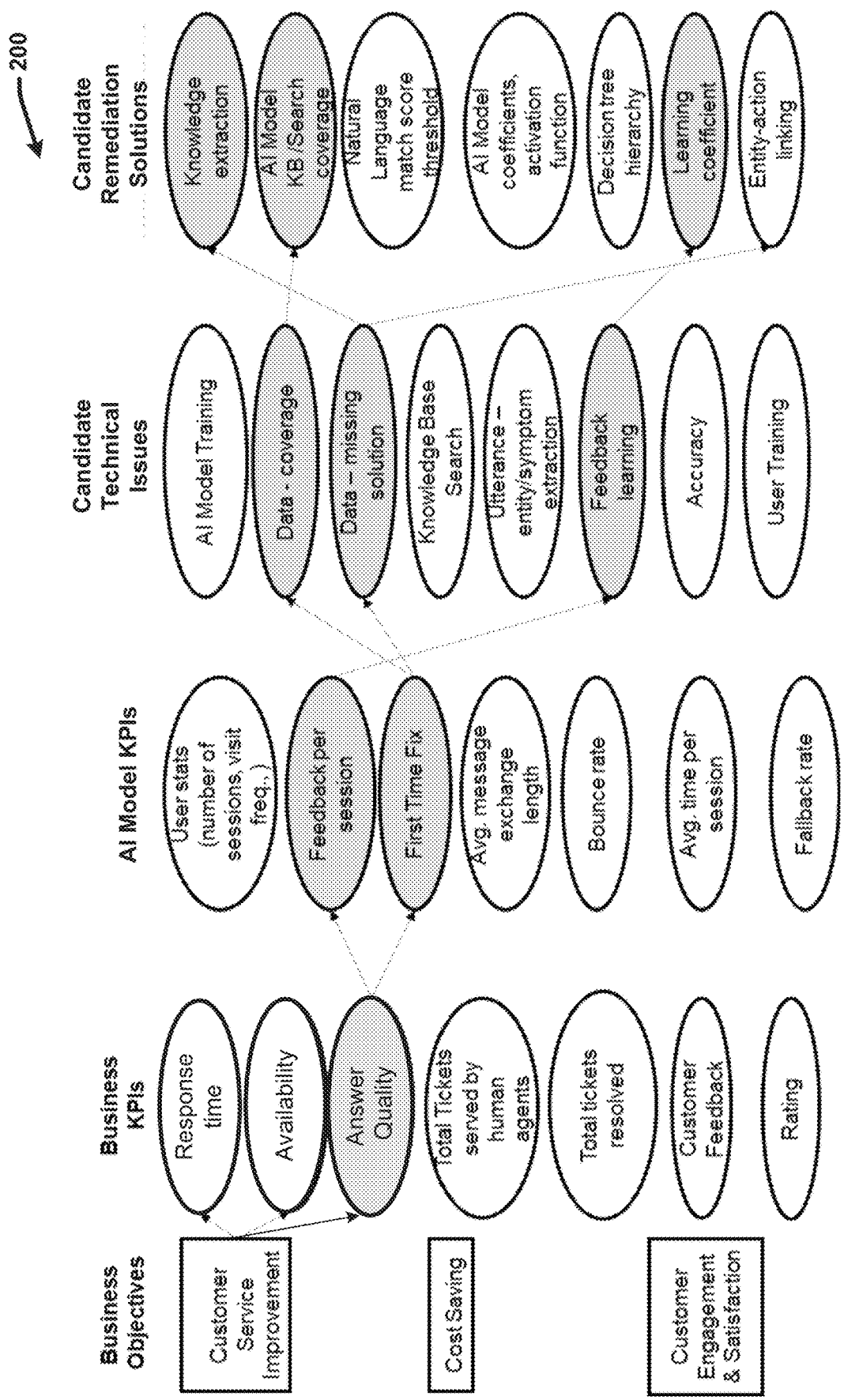
FIG. 3 presents an example mapping between an enterprise KPI, model performance KPIs, technical issues and remediation actions, in accordance with one or more embodiments described herein.

FIG. 3 presents one example mapping included in the data model 200 between an enterprise KPI, model performance KPIs, technical issues and remediation actions, in accordance with one or more embodiments described herein. In this example, the relevant nodes are called out in solid grey fill and the connection lines between the non-relevant nodes are removed from the graph for sake of clarity. The mapping illustrated in FIG. 3 presents one example mapping between the "answer quality" business KPI related to the customer service improvement objective. In accordance with this example, the data model 200 maps the "answer quality" business KPI to two AI model KPIs, which include "feedback per session" and "first time fix." The mapping illustrated in FIG. 3 demonstrates how the correlation component 132 and the remediation component 134 can employ the data model to correlated trends associated with one or more business KPIs to AI model KPIs, candidate technical issues, and candidate remediation solutions.

In this regard, with reference to FIGS. 1 and 3, the mapping illustrated in FIG. 3 is based on detected change/trend in a measure of answer quality provided by the chatbot AI, as determined by the detection component 130 based on the measure of answer quality falling below a defined threshold using the policy schema 140. Based on this detected trend, the correlation component 132 can employ the data model 200 to identify the potential AI model KPIs that have been defined to correlate to a drop or change in the answer quality, which in this case includes "feedback per session" and "first time fix" rate. The correlation component 132 can further employ the data model 200 to identify candidate technical issues associated with these AI model KPIs, which in this case include "data coverage," "missing data solutions," and "feedback learning." The remediation component 134 can further employ the data model 200 to identify candidate remediation solutions that have been previously mapped/correlated to these candidate technical issues, which in this case include improving/adjusting the "knowledge extraction" functions of the chatbot, adjusting the "AI model KB/search coverage," and "adjusting the learning coefficient."

It should be appreciated that the business KPIs, the AI model KPIs, the candidate technical issues, the candidate remediation solutions, and the mappings defined between these graph nodes will vary based on the enterprise system 102 and the task or tasks that the AI model 104 is adapted to perform. In accordance with one or more embodiments as applied to the chatbot AI implementation, the candidate remediation solutions can be categorized into offline actions and online actions, wherein the offline actions include actions related to offline AI model training and content coverage, and wherein online actions include actions that can be automatically executed/applied in the runtime environment of the AI model 104 and the enterprise system 102. For instance, some example offline actions can include, but are not limited to: adding missing content to the training data set and the AI model content in the AI model content knowledge base 106 (e.g., correlated to unavailability of chatbot answers/responses in the AI model knowledge base 106), augmenting the diversity of the training data set (e.g., correlated to skewed results), augmenting the coverage for entities in the AI model content in the AI model content knowledge base 106 (e.g., correlated to low entity match scores from user utterances), and adjusting the AI model preprocessing and feature extraction protocols (e.g., including optimizing utterance analysis, entity symptom extraction, entity linking, entity-action linking, procedure extraction, and answer extraction. Some example, online actions can include, but are not limited to: adjusting one or more configurations/parameters of the AI model (e.g., weights, coefficients, parameters, activation functions, decision boundaries, decision tree hierarchy, etc.), and performing user feedback learning by generating instant feedback per chat session, and/or by generating consolidated feedback scores (e.g., over a time period, per product/sub-product, per customer, per user, per symptom, etc.).

Table 1 below provides some examples of different trends that can be detected by the detection component 130 and how these trends can be correlated to specific enterprises/AI model KPIs, technical issues, and recommendation actions by the correlation component 132 and the remediation component 134 using the rules schema 142 as applied to usage of chatbot AI for automating some customer service interactions for an enterprise system. In accordance with the examples shown in Table 1, the policy schema 140 can provide the information utilized by the detection component 130 to determine/detect what constitutes a trend (e.g., a negative trend). In this regard, the policy schema 140 can provide information that identifies specific KPIs and/or combinations of KPIs to monitor for trends, and the degree of change in the KPIs that equate to a significant change to be considered a trend. The rules schema can further provide the information (e.g., data model 200 or the like) utilized by the correlation component 130 and the remediation component 134 to correlate the detected trends with AI model KPIs, AI model related issues, and recommendations and actions. In some embodiments, the policy schema 140 can also provide rules and policies tailored specifically for the enterprise system 102 that control the recommendations and actions provided by the recommendation component 136. For example, the policy schema 140 can define rules regarding how to adjust certain AI model parameters, weights and coefficients and other optimization constraints. The policy schema 140 can also define rules and policies regarding when to provide recommendations and when to implement certain actions.

TABLE 1

| Trend Observed | Correction/ Validation | Issue | Recommendations and Actions |
|---|---|---|---|
| Increase in bounce rate | 1. Correlate with too many symptom options presented 2. Correlate with Entity/Symptom match score | Natural Language Machine Issue | Adjust Threshold for Good Match Score |
| Increase in Negative User Feedback | Correlate over a period of time and for similar set of questions (same product/ component, symptom) | System did not learn from the feedback | Adjust the learning coefficient |
| Drop in user per day and conversations per day | Correlate with feedback and bounce rate | Chatbot accuracy issue, KG search, Elastic search results - missing entities | Add New Content, Entities, etc. |
| Increase in length/ duration per chat session | 1. Correlate with entities identified in utterance analysis 2. Validate entities identified in follow up question (either too large or too small/none) 3. Correlate user responses (increased cognitive burden) 4. Validate User Profile (Experience vs. New | 1. Inexperienced User 2. Length of facets presented > Average Length of Facets presented 3. Average Number of user clicks "None of these" > Average number of typical user responses | 1. User Training 2. KG search/ Elastic search results - missing entities -> Disambiguation Metadata To be Updated, KG Schema 3. Facets Search Logic, Add New Content, Entities, Interaction Flow Optimization |

As discussed above, in various embodiments, the performance evaluation component 126, the remediation component 134 and the recommendation component 136 can employ defined rules and polices provided in the schema database 138 to detect trends, determine issues and determine appropriate recommendations and actions. Additionally, or alternatively, the performance evaluation component 126, the remediation component 134 and the recommendation component 136 can employ principles of artificial intelligence to facilitate learning one or more patterns in the tracked metrics 150 and/or the information included in the AI content model knowledge base 106 (e.g., including tracked usage data and content associated with each chat session in chatbot AI implementations), determining one or more relationships between the business and AI model KPIs, determining one or more relationships between the business and AI model KPIs and technical issues associated with the AI model 104, and determining one or more relationships between the technical issues and the candidate solutions. The performance evaluation component 126, the remediation component 134 and the recommendation component 136 can perform learning associated with the tracked metrics 150, the policy schema 140, the rules schema 142 explicitly or implicitly. Learning and/or determining inferences by the performance evaluation component 126, the remediation component 134 and the recommendation component 136 can facilitate identification and/or classification of different patterns associated with the tracked metrics 150, determining one or more relationships between the business and AI model KPIs, determining one or more relationships between the business and AI model KPIs and technical issues associated with the AI model 104, and determining one or more relationships between the technical issues and the candidate solutions. The performance evaluation component 126, the remediation component 134 and the recommendation component 136 can also employ an automatic classification system and/or an automatic classification process to facilitate learning different patterns associated with the tracked metrics 150, determining one or more relationships between the business and AI model KPIs, determining one or more relationships between the business and AI model KPIs and technical issues associated with the AI model 104, and determining one or more relationships between the technical issues and the candidate solutions. For example, the performance evaluation component 126, the remediation component 134 and the recommendation component 136 can employ a probabilistic and/or statistical-based analysis (e.g., factoring into the analysis utilities and costs) to learn one or more patterns associated with the tracked metrics 150, determining one or more relationships between the business and AI model KPIs, determining one or more relationships between the business and AI model KPIs and technical issues associated with the AI model 104, and determining one or more relationships between the technical issues and the candidate solutions. The performance evaluation component 126, the remediation component 134 and the recommendation component 136 can employ, for example, a support vector machine (SVM) classifier to learn one or more patterns in the historical patient flow data 116 and/or the patient flow data 118 as it is received in real-time, determine one or more rules associated with the historical patient flow data 116, and/or determine one or more relationships among the set of medical inpatient units. Additionally, or alternatively, the performance evaluation component 126, the remediation component 134 and the recommendation component 136 can employ other classification techniques associated with Bayesian networks, decision trees and/or probabilistic classification models. Classifiers employed by the performance evaluation component 126, the remediation component 134 and the recommendation component 136 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

In an aspect, the performance evaluation component 126, the remediation component 134 and/or the recommendation component 136 can include an inference component that can further enhance automated aspects of these components utilizing in part inference-based schemes to facilitate learning one or more patterns tracked metrics 150 and/or the information included in the AI content model knowledge base 106, determining one or more relationships between the business and AI model KPIs, determining one or more relationships between the business and AI model KPIs and technical issues associated with the AI model 104, and determining one or more relationships between the technical issues and the candidate solutions. The performance evaluation component 126, the remediation component 134 and/or the recommendation component 136 can employ any suitable machine-learning based techniques, statistical-based techniques and/or probabilistic-based techniques. The performance evaluation component 126, the remediation component 134 and the recommendation component 136 can additionally or alternatively employ a reduced set of factors (e.g., an optimized set of factors) to facilitate providing a most accurate machine learning model for identifying trends in the tracked metrics 150 and correlating these trends to technical issues associated with the AI model 104 and potential solutions. For example, the performance evaluation component 126, the remediation component 134 and/or the recommendation component 136 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the performance evaluation component 126, the remediation component 134 and/or the recommendation component 136 can perform a set of machine learning computations associated with tracked metrics, the usage data, the policy schema 140 and the rules schema 142. For example, the performance evaluation component 126, the remediation component 134 and/or the recommendation component 136 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. The one or more patterns, the one or more rules and/or the one or more relationships determined by the performance evaluation component 126, the remediation component 134 and/or the recommendation component 136 can be stored, for example, in a machine learning database and/or the memory 146.

In certain embodiments, the one or more patterns in the tracked metrics, and the relationships between the tracked metrics and corresponding issues and solutions can be configured as one or more digital fingerprints (e.g., one or more digital signatures) that represents one or more digital patterns associated with the tracked metrics. A digital fingerprint can be a string of bits associated with a portion of the tracked metrics 150. A digital fingerprint can also include a set of data values for one or more parameters over a defined period of time associated with the tracked metrics 150. In certain implementations, a digital fingerprint can comprise a sequence of sub-fingerprints associated with different patterns in the tracked metrics 150. Furthermore, a digital fingerprint can uniquely identify and/or convey a pattern in the tracked metrics 150. For example, a digital fingerprint can be a data element that encodes a pattern in the tracked metrics 150. A digital fingerprint can also be associated with a timestamp and/or a period of time for the tracked metrics 150. The performance evaluation component 126, the remediation component 134 and/or the recommendation component 136 can employ one or more digital fingerprinting techniques (e.g., one or more digital fingerprint algorithms) to map at least a portion of the tracked metrics 150 into a set of digital fingerprints. For example, the performance evaluation component 126, the remediation component 134 and/or the recommendation component 136 can employ a hash technique to generate the set of digital fingerprints associated with the one or more patterns in the tracked metrics 150. In another example, the performance evaluation component 126, the remediation component 134 and/or the recommendation component 136 can employ a locality sensitive hashing technique to generate the set of digital fingerprints associated with the one or more patterns in the tracked metrics 150. In yet example, the performance evaluation component 126, the remediation component 134 and/or the recommendation component 136 can employ a random hashing technique to generate the set of digital fingerprints associated with the one or more patterns in the tracked metrics 150. In an implementation, a digital fingerprint can comprise min-hash values associated with a portion of the tracked metrics 150. For example, a digital fingerprint can comprise a vector of min-hash values associated with a portion of the tracked metrics 150. In another example, a digital fingerprint can comprise a band of min-hash values associated with a portion of the tracked metrics 150. In yet another example, a digital fingerprint can comprise a locality-sensitive hashing band of min-hash values associated with a portion of the tracked metrics 150. However, it is to be appreciated that other types of digital fingerprinting techniques and/or hashing techniques can be employed to generate a digital fingerprint associated with the tracked metrics 150.

Figure 4:
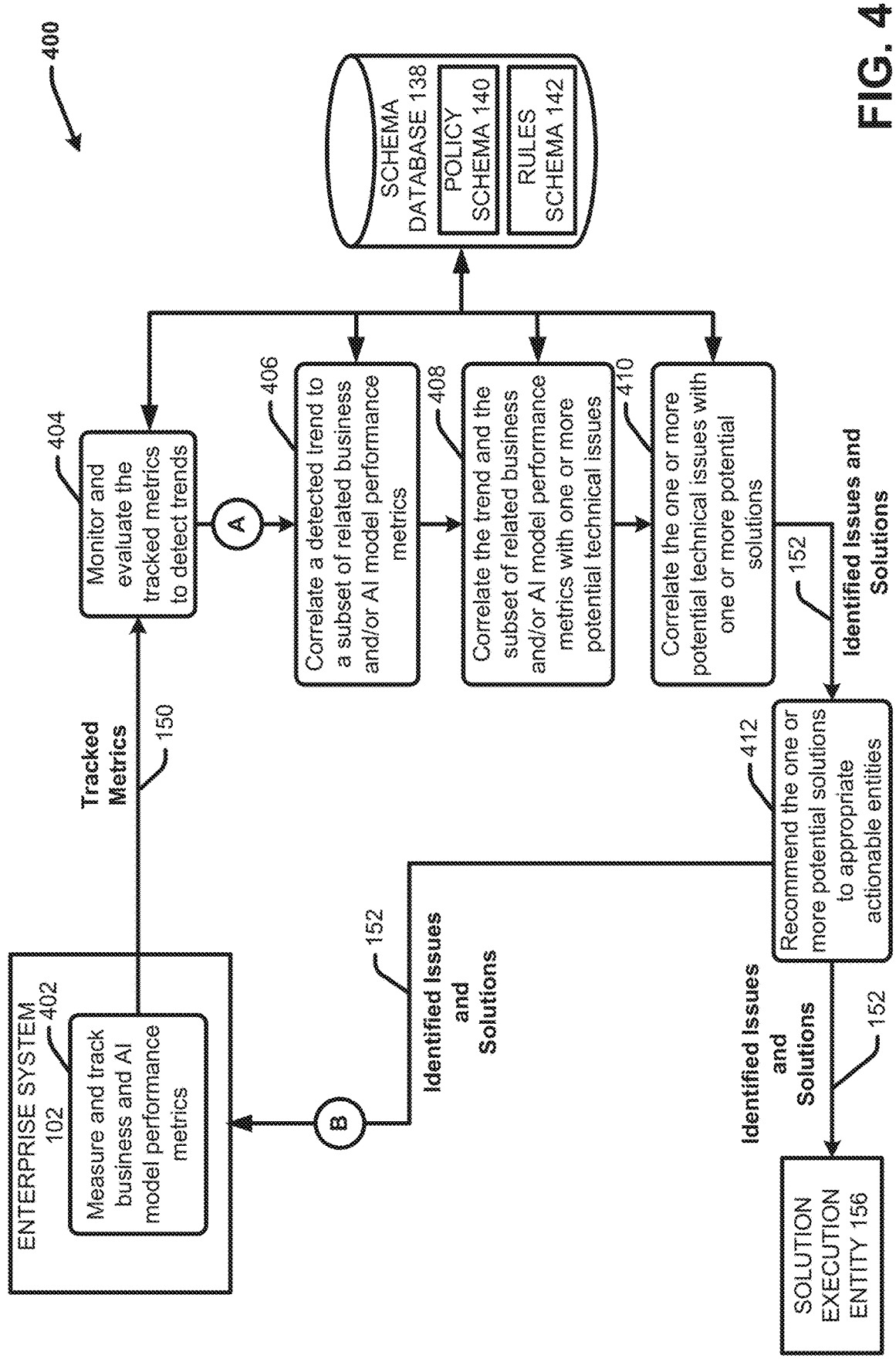
FIG. 4 illustrates a flow diagram of an example, non-limiting process for monitoring and evaluating effects of an AI model on enterprise performance metrics, in accordance with one or more embodiments described herein.

FIG. 4 illustrates a flow diagram of an example, non-limiting process 400 for monitoring and evaluating effects of an AI model on enterprise performance metrics, in accordance with one or more embodiments described herein. Process 400 provides an example process 400 that can be performed by system 100 by the AI model performance regulation system 124.

In accordance with process 400, at 402 the enterprise system 102 can measure and track business and AI model performance metrics (e.g., KPIs) and provide the tracked metrics 150 to the AI model performance regulation system 124. At 404, the AI model performance regulation system 124 can monitor and evaluate the tracked metrics to detect trends. For example, the detection component 130 can employ defined rules and policies (e.g., provided in the policy schema 140) that define specific KPIs or combinations of KPIs and the desired values or value ranges for these KPIs. The detection component 130 can further identify trends (e.g., negative trends) based the values or value ranges of these KPIs dropping below their desired value or value ranges. At 406, the system can correlate a detected trend (associated with one or more specific KPIs) to a subset of related business and/or AI model performance metrics (e.g., using correlation component 132 and the rules schema 142). At 408, the system can correlate the trend and the subset of related business and/or AI model performance metrics with one or more potential technical issues associated with the AI model (e.g., using correlation component 132 and the rules schema 142). At 410, the system can correlate the one or more potential technical issues with one or more potential solutions (e.g., using remediation component 134 and the rules schema 142). At 412, the system can provide information regarding the identified issues and the one or more potential solutions (e.g., identified issues and solutions 152 data) to the one or more appropriate actionable entities for execution thereof (e.g., via recommendation component 136). For example, in the embodiment shown, the identified issues and solutions 152 data can be provided to the solution execution entity 156 and/or the enterprise system 102.

Figure 5:
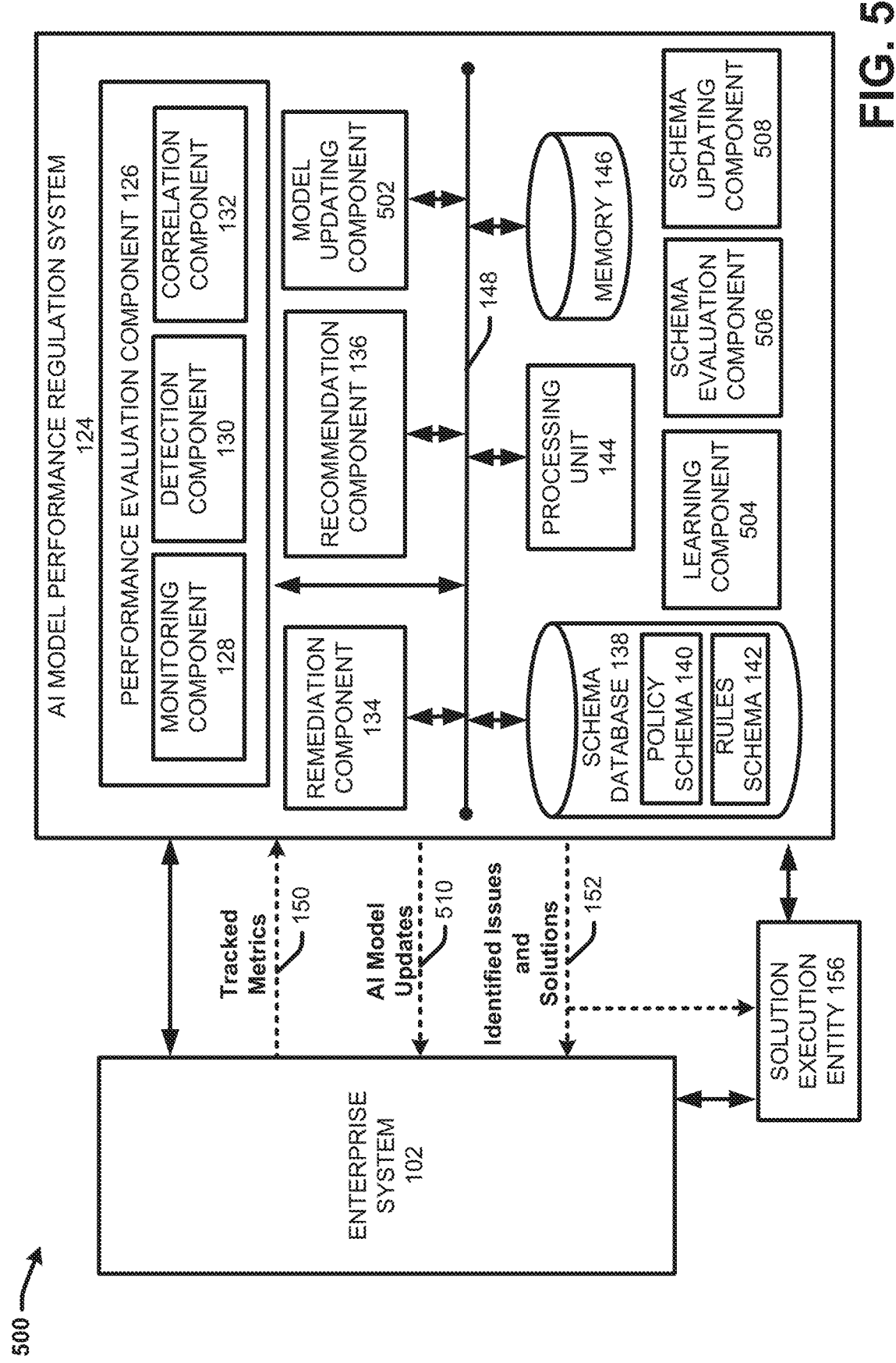
FIG. 5 illustrates a block diagram of another example, non-limiting system that can facilitate monitoring and evaluating effects of an AI model on enterprise performance metrics, in accordance with one or more embodiments described herein.

FIG. 5 illustrates a block diagram of another example, non-limiting system 500 that can facilitate monitoring and evaluating effects of an AI model on enterprise performance metrics, in accordance with one or more embodiments described herein. System 500 include same or similar components, feature and functionalities as system 100 with the addition of model updating component 502, learning component 504, schema evaluation component 506, and schema updating component 508. The various components of the enterprise system 102 have been removed in FIG. 5 for the purpose of simplifying the complexity of the drawing. It should be appreciated the enterprise system 102 can include one or more of the components associated therewith shown in FIG. 1. Repetitive description of like elements employed in respective embodiments is omitted for sake of brevity.

As discussed above, in some embodiments, one or more of the technical solutions identified by the remediation component 134 can be automatically implemented or executed online during runtime of the AI model 104. For example, such technical solutions that can automatically be executed/implemented can include changes to one or more configuration parameters of the AI model 104, such as but not limited to, changing one or more parameters of the model, changing one or more weights/coefficients, changing one or more thresholds, changing activation functions, changing decision boundaries, and changing decision tree hierarchies. With these embodiments, the model updating component 502 can be configured to automatically update the AI model to incorporate the changes identified by the remediation component 134. For example, the model updating component 502 can execute the updates for the AI model and provided the AI model update 510 to the enterprise system for usage thereof. In some implementations, the AI model updates 510 can correspond to an updated version of the AI model 104. With these implementations, the AI model performance regulation system 124 can include or otherwise have access to an instance of the AI model 104 and/or one or more updated versions of AI model 104 (e.g., in memory 146, in memory of the enterprise system, or another suitable network accessible storage location). Further, based on provision of the updated version of the AI model to the enterprise system 102, the enterprise system can be configured to replace the previous version of the AI model 104 with the updated version. The policy schema 140 can further define polices/rules that control when and how the model updating component 502 is authorized to automatically execute such AI model updates, as well as defined updating constraints and requirements.

The learning component 504, the schema evaluation component 506 and the schema updating component 508 can further perform a continuous learning regime to learn whether and how implemented solutions/changes to the AI model parameters, AI model training, AI model content knowledge base (KB) and other offline remediation actions impact the business KPIs, and further modify/update the policy schema 140 and/or the rules schema 142 accordingly. In this regard, the learning component 504 can evaluate how implemented technical solutions, actions and recommendations determined by the remediation component 134 impact the tracked metrics 150. For example, the once a solution has been implemented, the enterprise system 102 can configured to generate the tracked metrics and provide them to the monitoring component 128. The monitoring component 128 can further aggregate the tracked metrics and the detection component 130 can detect changes/trends in the tracked metrics. The learning component 504 can further track historical information regarding what solutions were implemented, when and why. For example, the learning component can track information regarding what were the previously correlated root business and AI model KPIs and technical issue or issues that were correlated to the implementing a particular solution. The learning component 504 can further specifically evaluate whether and how (e.g., to what degree) an implemented solution positively or negatively impacted the root metrics based on detected changes in the root business and/or AI model KPIs. In this regard, the learning component 504 can observe intended improvements for actions take by comparing against the changes in the related metrics and KPIs.

The schema evaluation component 506 can further evaluate the policy schema 140 and/or the rules schema 142 based on the learned impacts to gain a better understanding of the correlations and relationships between the relevant KPIs, technical issues and the implemented solution. For example, the schema evaluation component 506 can determine or infer changes to the policy schema 140 and/or the rules schema 142 based on the impact of the implemented solution and the existing schema. For example, the schema evaluation component 506 can determine or infer changes to one or more mappings between nodes in the data model (e.g., data model 200 or the like), changes in node hierarchies, changes in node weights, and other relationships defined by the data model. The schema updating component 508 can further implement/execute the changes to the policy schema 140 and/or the rules schema 142, resulting in updated schema. This process can be regularly and/or continuously performed, wherein after each iteration of updating, the performance evaluation component 126, the remediation component 134 and the recommendation component 136 employ the updated schema to perform their analysis.

Figure 6:
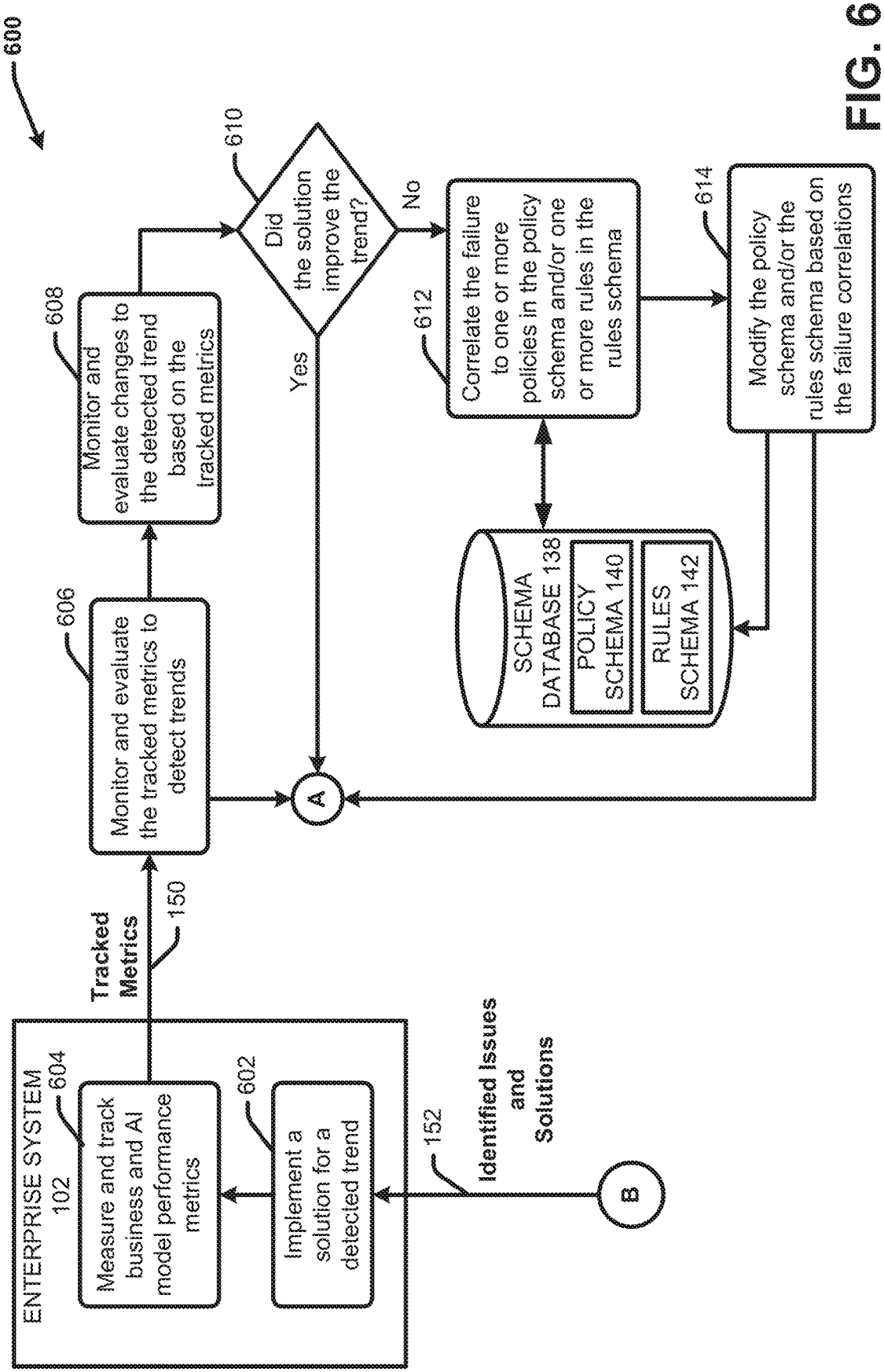
FIG. 6 illustrates a flow diagram of another example, non-limiting process for monitoring and evaluating effects of an AI model on enterprise performance metrics, in accordance with one or more embodiments described herein.

FIG. 6 illustrates a flow diagram of another example, non-limiting process 600 for monitoring and evaluating effects of an AI model on enterprise performance metrics, in accordance with one or more embodiments described herein. Process 600 provides an example process that can be performed by system 500 by the AI model performance regulation system 124. With reference to FIGS. 4 and 6, both processes 400 and 600 include reference points A and B. Processes 600 corresponds to an extension of process 400 starting at reference point B. Repetitive description of like elements employed in respective embodiments is omitted for sake of brevity.

In accordance with process 600, at 602, the enterprise system can implement a solution for a detected trend. For example, the implemented solution may include an update/reconfiguration to one or more parameters or thresholds of the AI model (e.g., automatically implemented/executed by the model updating component 502). Other example, solutions as applied to the AI chatbot implementation may include the example solutions provided in data model 200 and/or Table 1. At 604, the enterprise system 102 can continue to measure and track the business and AI model performance metrics (e.g., KPIs) and provide the tracked metrics 150 to the AI model performance regulation system 124. At 606, the AI model performance regulation system 124 can continue to monitor and evaluate the tracked metrics to detect trends. Process 600 can further continue in accordance with process 400 from reference point A. In addition, process 600 can involve continuous learning by tracking and evaluating whether the implemented solution improved the relevant business and/or AI model KPIs as intended (e.g., via the learning component 504). In this regard, at 608, the system can monitor and evaluate changes to the detected trend based on the tracked metrics 150. At 610, based on a determination that the solution improved the trend, process 600 can return to monitoring and evaluating the tracked metrics as usual, continuing from reference point A. However, based on a determination that the solution did not improve the trend, the system can correlate the failure to one or more policies in the policy schema 140 and/or one or more rules in the rules schema 142 (e.g., using schema evaluation component 506). At 614, the system can further modify the policy schema and/or the rules schema based on the failure correlations (e.g., using schema updating component 508). Thereafter, process 600 can further continue in accordance with process 400 from reference point A.

Figure 7:
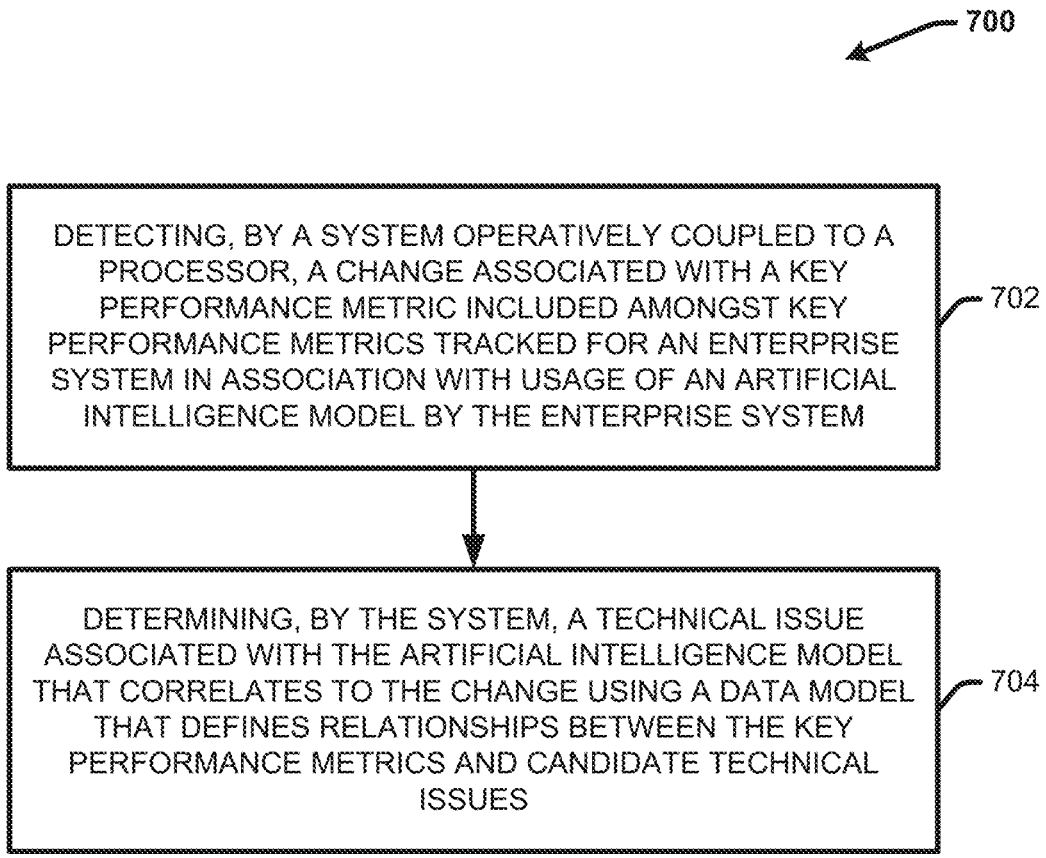
FIG. 7 illustrates a flow diagram of an example, non-limiting computer-implemented method for monitoring and evaluating effects of an AI model on enterprise performance metrics, in accordance with one or more embodiments described herein.

FIG. 7 illustrates a flow diagram of an example, non-limiting computer-implemented method 700 for monitoring and evaluating effects of an AI model on enterprise performance metrics, in accordance with one or more embodiments described herein. In accordance with method 700, at 702, a system operatively coupled to a processor (e.g., system 100, system 500 or the like) can detect a change associated with a performance metric included amongst performance metrics tracked for an enterprise system in association with usage of an AI model (e.g., AI model 104) by the enterprise system (e.g., using detection component 130). At 702, the system can determine a technical issue associated with the AI model that correlates to the change using a data model that defines relationships between the performance metrics and candidate technical issues (e.g., via correlation component 132 and remediation component 134 using a data model such as data model 200 provided in the rules schema 142).

Figure 8:
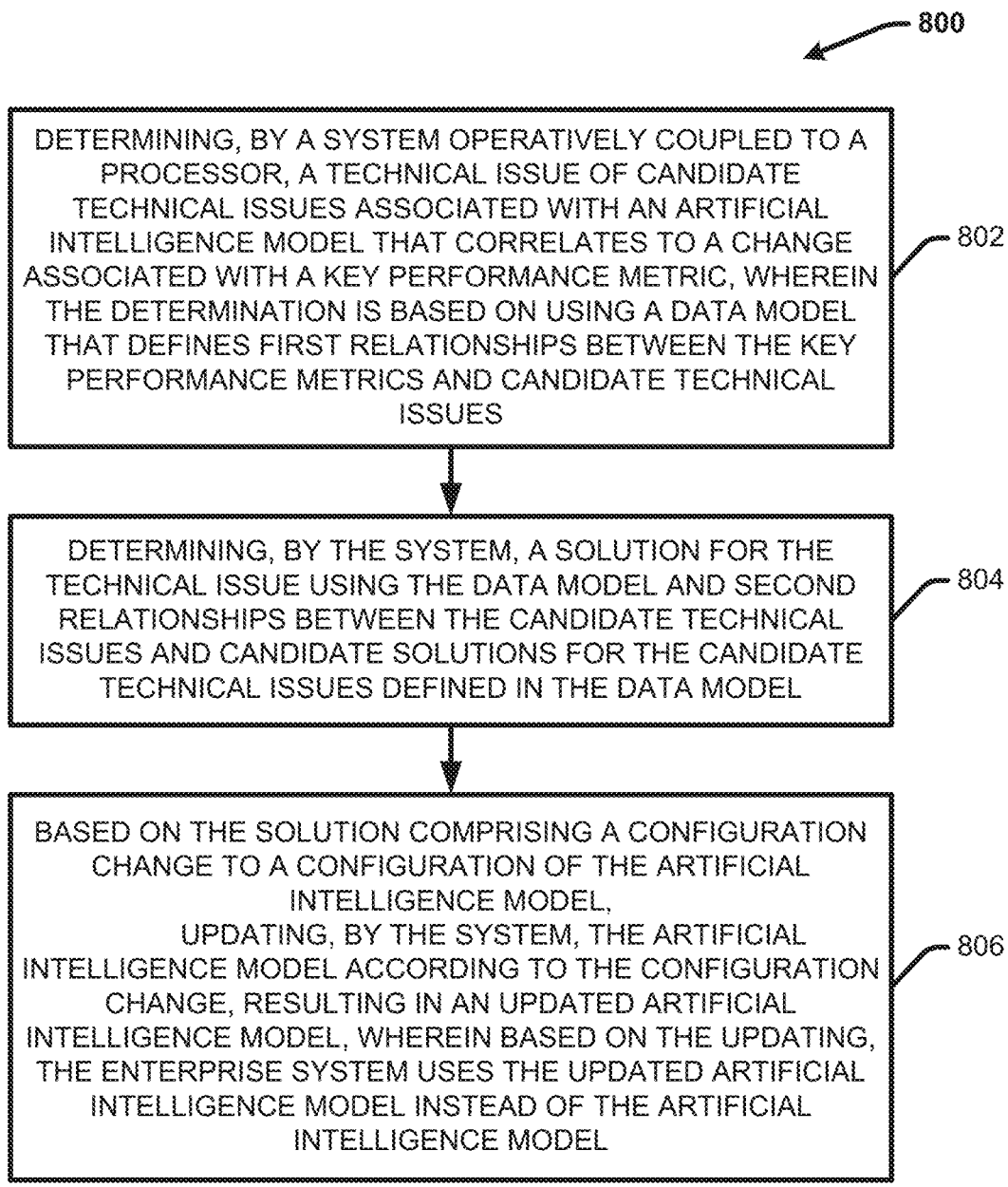
FIG. 8 illustrates a flow diagram of another example, non-limiting computer-implemented method for monitoring and evaluating effects of an AI model on enterprise performance metrics, in accordance with one or more embodiments described herein.

FIG. 8 illustrates a flow diagram of another example, non-limiting computer-implemented method 800 for monitoring and evaluating effects of an AI model on enterprise performance metrics, in accordance with one or more embodiments described herein. In accordance with method 800, at 802 a system operatively coupled to a processor (e.g., system 100, system 500 or the like) can determine a technical issue of candidate technical issues associated with an AI model that correlates to a change associated with KPI, wherein the determination is based on a data model that defines first relationships between the performance metrics and the candidate technical issues (e.g., via correlation component 132 and remediation component 134 using a data model such as data model 200 provided in the rules schema 142). At 804, the system can determine a solution for the technical issues using the data model and second relationships between the candidate technical issues and candidate solutions for the candidate technical issues defined in the data model. At 806, based on the solution comprising a configuration change to a configuration of the AI model (e.g., parameter changes, coefficient/weight changes, threshold changes, etc.), the system can update the AI model according to the configuration change (e.g., via the model updating component 502), resulting in an updated AI model, wherein based on the updating, the enterprise system uses the updated AI model instead of the AI model.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In one or more embodiments, one or more of the processes described herein can be performed by one or more specialized computers (e.g., a specialized processing unit, a specialized classical computer, a specialized quantum computer and/or another type of specialized computer) to execute defined tasks related to the various technologies identified above. System 100, system 500 and/or components thereof, can be employed to solve new problems that arise through advancements in technologies mentioned above, employment of quantum computing systems, cloud computing systems, computer architecture and/or another technology.

According to one or more embodiments, system 100, system 500 and/or components thereof, also can be fully operational towards performing one or more other functions (e.g., fully powered on, fully executed and/or another function) while also performing the various operations described herein.

Figure 9:
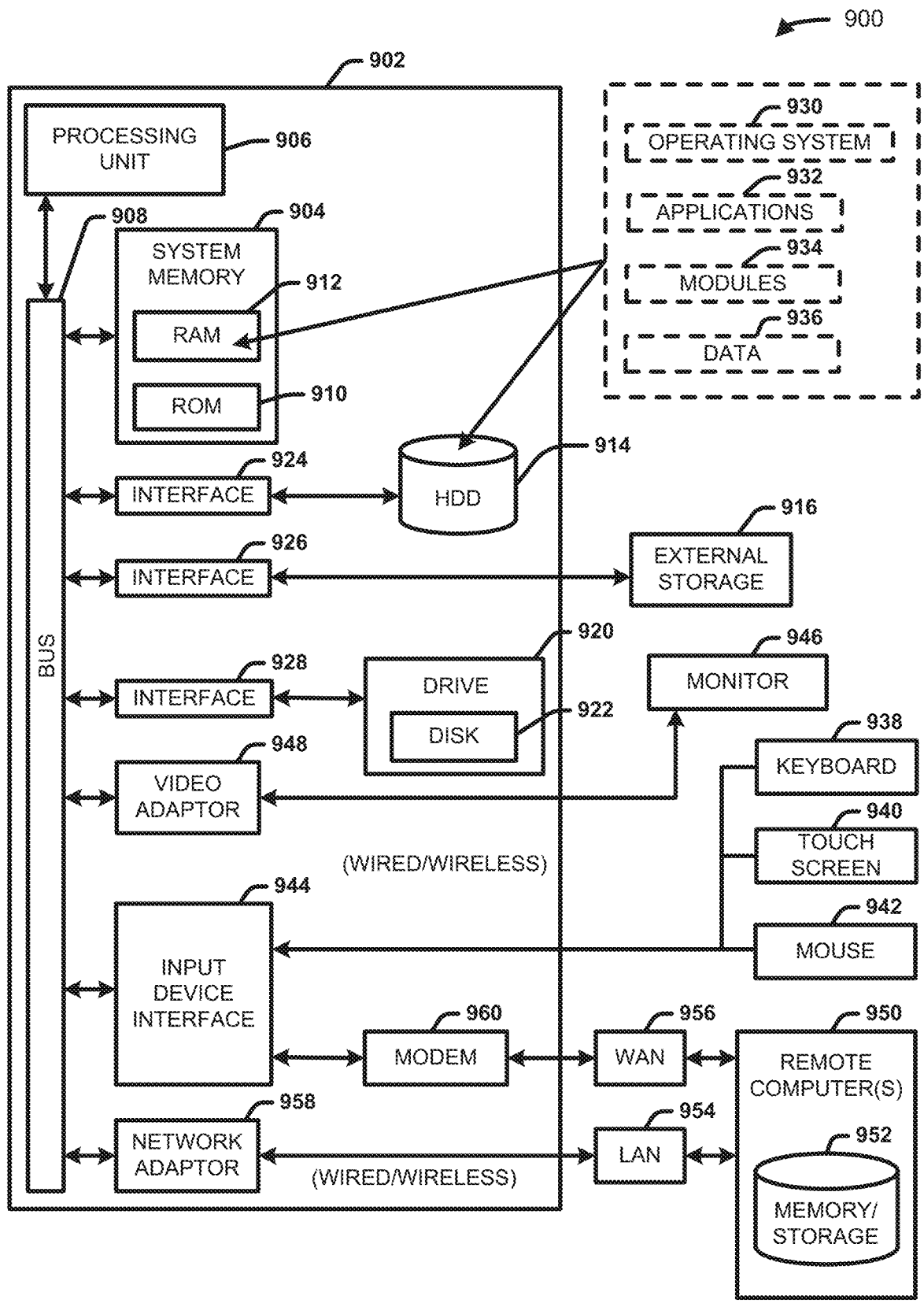
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable operating environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, disk storage and/or other magnetic storage devices, solid state drives and/or other solid state storage devices, and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media such as acoustic, RF, infrared and/or other wireless media.

With reference again to FIG. 9, the example operating environment 900 for implementing various embodiments of the aspects described herein includes a computer 902, the computer 902 including a processing unit 906, a system memory 904 and/or a system bus 908. The system bus 908 can couple system components including, but not limited to, the system memory 904 to the processing unit 906. The processing unit 906 can be any of various commercially available processors. Dual microprocessors and/or other multi-processor architectures can be employed as the processing unit 906.

The system bus 908 can be any of one or more types of bus structure that can further interconnect to a memory bus (with or without a memory controller), a peripheral bus and/or a local bus using any of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can also include a high-speed RAM, such as static RAM for caching data.

The computer 902 further can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and methods described herein can be implemented utilizing various commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

A user entity can enter commands and information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 906 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be also connected to the system bus 908 via an interface, such as a video adapter 948. In addition, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal or external and a wired and/or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link among the computers can be used.

When used in either a LAN or WAN networking environment, the computer 902 can access cloud storage systems or other network-based storage systems in addition to, or in place of, external storage devices 916 as described above, such as but not limited to, a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902. The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like), and/or telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
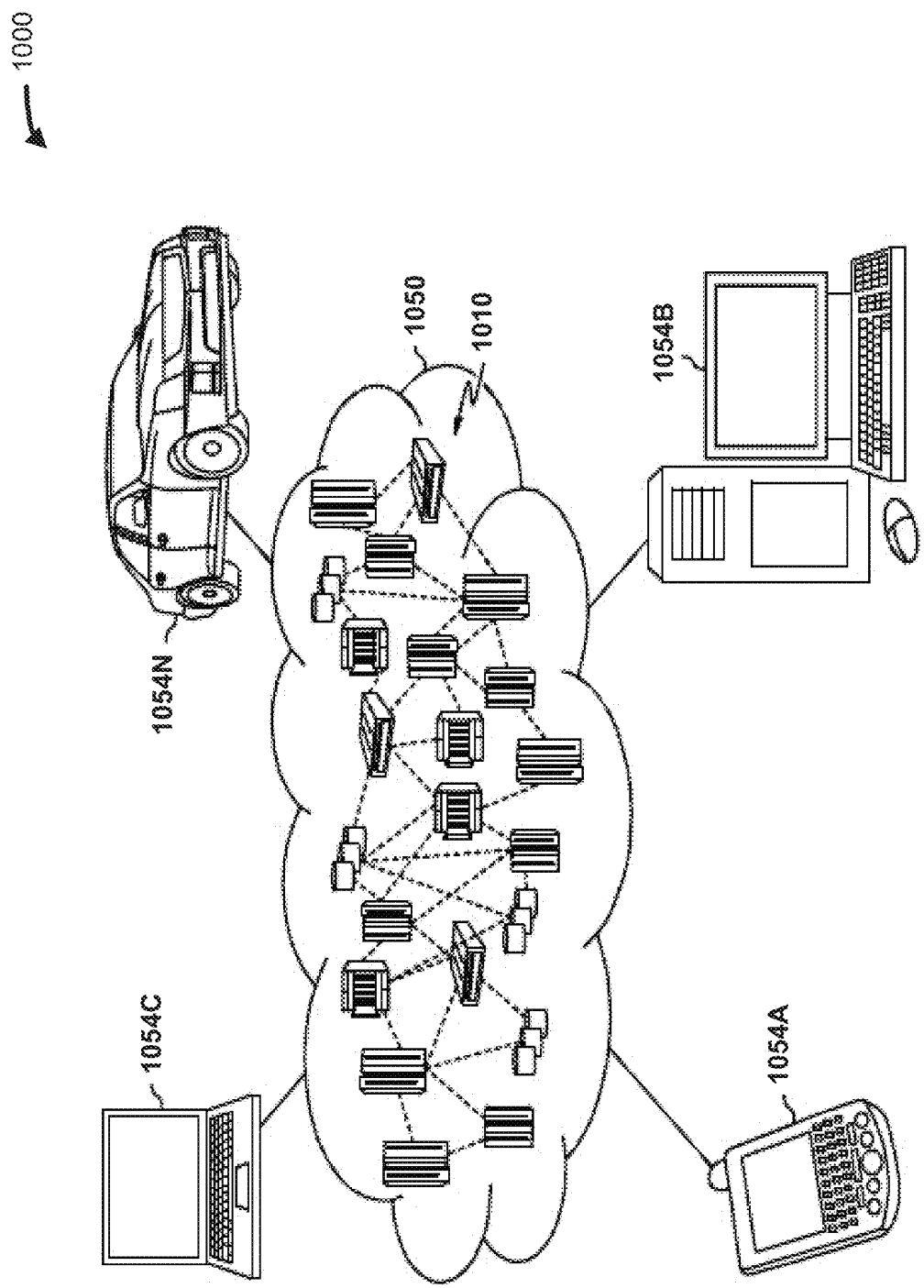
FIG. 10 illustrates a block diagram of an example, non-limiting cloud computing environment in accordance with one or more embodiments described herein.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Referring now to FIG. 11, a set of functional abstraction layers is shown, such as provided by cloud computing environment 1050 (FIG. 10). It should be understood in advance that the components, layers and functions shown in FIG. 11 are intended to be illustrative only and embodiments described herein are not limited thereto. As depicted, the following layers and corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and networks and networking components 1166. In one or more embodiments, software components can include network application server software 1167, quantum platform routing software 1168 and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1183 can provide access to the cloud computing environment for consumers and system administrators. Service level management 1184 can provide cloud computing resource allocation and management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++, or the like, and/or procedural programming languages, such as the "C" programming language or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein. Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems and/or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a detection component that:
            detects, via a machine learning model, a first trend associated with first performance metrics tracked for an enterprise system, wherein the first trend comprises at least one first change to at least one of the first performance metrics, and correlates, via the machine learning model, the first trend with a second trend associated with second performance metrics tracked for an artificial intelligence model employed by the enterprise system that performs an automated task for the enterprise system, wherein the automated task comprises a customer service interaction task, wherein the second trend comprises at least one second change to at least one of the second performance metrics, wherein the first performance metrics measure one or more business objectives of an enterprise associated with the enterprise system, and the first performance metrics are not determined directly using any output of the artificial intelligence model, and wherein the second performance metrics measure one or more performance objectives of the artificial intelligence model, and the second performance metrics are determined directly using one or more outputs of the artificial intelligence model;

a correlation component that determines, via the machine learning model, based on the correlation of the first trend and the second trend, a technical issue associated with the artificial intelligence model that correlates to the at least one first change to the at least one of the first performance metrics using a data model that defines first relationships between the second performance metrics and candidate technical issues associated with the artificial intelligence model;

a remediation component that determines, via the machine learning model, a solution for the technical issue; and a model updating component that updates, via the machine learning model, the artificial intelligence model according to a configuration change based on a determination that the solution comprises the configuration change, resulting in an updated artificial intelligence model.

2. The system of claim 1, wherein the data model further defines second relationships between the candidate technical issues and candidate solutions for the candidate technical issues, and wherein the machine learning model determines the solution for the technical issue using the data model.

3. The system of claim 1, wherein the computer executable components further comprise:
a recommendation component that generates, via the machine learning model, a recommendation identifying the solution and provides the recommendation to one or more entities associated with the enterprise system or the artificial intelligence model.

4. The system of claim 1, wherein based on the updating, the enterprise system uses the updated artificial intelligence model instead of the artificial intelligence model.

5. The system of claim 1, wherein the computer executable components further comprise:
a tracking component that determines, via the machine learning model, a third trend associated with the first performance metrics following execution of the solution; and
a learning component that determines, via the machine learning model, whether and how the solution impacts the at least one first change to the at least one of the first performance metrics based on the third trend.

6. The system of claim 5, wherein the computer executable components further comprise:

a schema evaluation component that determines, via the machine learning model, one or more adjustments to the data model based on whether and how the solution impacts the at least one first change to the at least one of the first performance metrics; and
a schema updating component that updates, via the machine learning model, the data model to comprise the one or more adjustments.

7. The system of claim 1, further comprising a schema updating component that updates, via the machine learning model, the data model to define third relationships between the first performance metrics and the second performance metrics based on the correlation between the first trend and the second trend.

8. The system of claim 1, wherein the artificial intelligence model comprises a chatbot that performs the customer service interaction task for the enterprise system.

9. The system of claim 1, wherein the customer service interaction task comprises a medical image processing task.

10. A computer-implemented method, comprising:
detecting, by a system operatively coupled to a processor, via a machine learning model, a first trend associated with first performance metrics tracked for an enterprise system, wherein the first trend comprises at least one first change to at least one of the first performance metrics;
correlating, by the system, via the machine learning model, the first trend with a second trend associated with second performance metrics tracked for an artificial intelligence model employed by the enterprise system that performs an automated task for the enterprise system, wherein the automated task comprises a customer service interaction task, and wherein the second trend comprises at least one second change to at least one of the second performance metrics;
determining, by the system, via the machine learning model, based on the correlation of the first trend and the second trend, a technical issue associated with the artificial intelligence model that correlates to the at least one first change to the at least one of the first performance metrics using a data model that defines first relationships between the second performance metrics and candidate technical issues associated with the artificial intelligence model,
wherein the first performance metrics measure one or more business objectives of an enterprise associated with the enterprise system, and the first performance metrics are not determined directly using any output of the artificial intelligence model, and
wherein the second performance metrics measure one or more performance objectives of the artificial intelligence model, and the second performance metrics are determined directly using one or more outputs of the artificial intelligence model;
determining, by the system, via the machine learning model, a solution for the technical issue; and
updating, by the system, via the machine learning model, the artificial intelligence model according to a configuration change based on a determination that the solution comprises the configuration change, resulting in an updated artificial intelligence model.

11. The computer-implemented method of claim 10, wherein the data model further defines second relationships between the candidate technical issues and candidate solutions for the candidate technical issues, and wherein the determining the solution comprises determining the solution using the data model.

12. The computer-implemented method of claim 10, further comprising:
- generating, by the system, via the machine learning model, a recommendation identifying the solution; and
- providing, by the system, the recommendation to one or more entities associated with the enterprise system or the artificial intelligence model.

13. The computer-implemented method of claim 10, wherein based on the updating, the enterprise system uses the updated artificial intelligence model instead of the artificial intelligence model.

14. The computer-implemented method of claim 10, further comprising:
- determining, by the system, via the machine learning model, a third trend associated with the first performance metrics following execution of the solution; and
- determining, by the system, via the machine learning model, whether and how the solution impacts the at least one first change to the at least one of the first performance metrics based on the third trend.

15. The computer-implemented method of claim 14, further comprising:
- determining, by the system, via the machine learning model, one or more adjustments to the data model based on whether and how the solution impacts the at least one first change to the at least one of the first performance metrics; and
- updating, by the system, via the machine learning model, the data model to comprise the one or more adjustments.

16. The computer-implemented method of claim 10, further comprising updating by the system, via the machine learning model, the data model to define third relationships between the first performance metrics and the second performance metrics based on the correlation between the first trend and the second trend.

17. The computer-implemented method of claim 10, wherein the artificial intelligence model comprises a chatbot that performs the customer service interaction task for the enterprise system.

18. A non-transitory computer readable storage medium having program instructions embodied therewith, the program instructions executable by a processor to cause the processor to:
- detect, by the processor, via a machine learning model, a first trend associated with first performance metrics tracked for an enterprise system, wherein the first trend comprises at least one first change to at least one of the first performance metrics;
- correlate, by the processor, via the machine learning model, the first trend with a second trend associated with second performance metrics tracked for an artificial intelligence model employed by the enterprise system that performs an automated task for the enterprise system, wherein the automated task comprises a customer service interaction task, and wherein the second trend comprises at least one second change to at least one of the second performance metrics,
  - wherein the first performance metrics measure one or more business objectives of an enterprise associated with the enterprise system, and the first performance metrics are not determined directly using any output of the artificial intelligence model, and
  - wherein the second performance metrics measure one or more performance objectives of the artificial intelligence model, and the second performance metrics are determined directly using one or more outputs of the artificial intelligence model;
- determine, by the processor, via the machine learning model, based on the correlation of the first trend and the second trend, a technical issue associated with the artificial intelligence model that correlates to the at least one first change to the at least one of the first performance metrics using a data model that defines first relationships between the second performance metrics and candidate technical issues associated with the artificial intelligence model
- determine, by the processor, via the machine learning model, a solution for the technical issue; and
- update, by the processor, via the machine learning model, the artificial intelligence model according to a configuration change based on a determination that the solution comprises the configuration change.

19. The non-transitory computer readable storage medium of claim 18, wherein the data model further defines second relationships between the candidate technical issues and candidate solutions for the candidate technical issues, and wherein the processor determines the solution for the technical issue using the data model.

20. The non-transitory computer readable storage medium of claim 18, wherein the artificial intelligence model comprises a chatbot.

* * * * *